United States Patent
Otsuka et al.

(10) Patent No.: US 6,816,278 B2
(45) Date of Patent: Nov. 9, 2004

(54) COMMUNICATION DEVICE AND STORAGE MEDIUM

(75) Inventors: Shuji Otsuka, Nagoya (JP); Kunihiro Yasui, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 51 days.

(21) Appl. No.: 09/945,804

(22) Filed: Sep. 5, 2001

(65) Prior Publication Data

US 2002/0033962 A1 Mar. 21, 2002

Related U.S. Application Data

(62) Division of application No. 08/946,661, filed on Oct. 7, 1997.

(30) Foreign Application Priority Data

Oct. 9, 1996 (JP) .............................................. 8-268568

(51) Int. Cl.[7] .................................................. B41B 1/00
(52) U.S. Cl. ....................... 358/1.15; 358/402; 358/403; 358/440; 379/88.23; 379/93.03; 379/100.08; 379/100.15; 382/115
(58) Field of Search ................................. 358/400, 402, 358/403, 434, 440, 468, 1.15; 379/88.22–88.23, 93.01–93.03, 100.08, 100.15; 382/115, 305

(56) References Cited

U.S. PATENT DOCUMENTS

| | | | |
|---|---|---|---|
| 4,922,524 A | | 5/1990 | Baba et al. |
| 5,237,430 A | | 8/1993 | Sakurai |
| 5,283,665 A | * | 2/1994 | Ogata .......................... 358/434 |
| 5,351,136 A | | 9/1994 | Wu et al. |
| 5,353,124 A | * | 10/1994 | Chou et al. .................. 358/400 |
| 5,438,433 A | | 8/1995 | Reifman et al. |
| 5,559,721 A | | 9/1996 | Ishii |
| H1677 H | * | 9/1997 | Hu et al. ..................... 358/468 |
| 5,717,498 A | | 2/1998 | Itoh |
| 5,727,050 A | | 3/1998 | Mori et al. |
| 5,739,918 A | * | 4/1998 | Ouchi .......................... 358/403 |
| 5,805,673 A | * | 9/1998 | Underwood et al. ..... 379/93.01 |
| 5,825,871 A | | 10/1998 | Mark |
| 5,870,206 A | * | 2/1999 | Ouchi .......................... 358/402 |
| 5,894,416 A | * | 4/1999 | Kuroyanagi ..................... 700/9 |
| 5,912,951 A | * | 6/1999 | Checchio et al. .......... 379/88.22 |
| 6,061,502 A | * | 5/2000 | Ho et al. .................... 358/1.15 |

* cited by examiner

Primary Examiner—Bhavesh M. Mehta
Assistant Examiner—Gregory Desire
(74) Attorney, Agent, or Firm—Oliff & Berridge, PLC

(57) ABSTRACT

A communication device is provided wherein a message stored in a message box for a specific individual and a message stored in a general mail box and not addressed to a specific individual can be retrieved sequentially without releasing a line. The communication device includes a personal information output control device that reads personal information stored in a personal information storing device and outputs the personal information via a telecommunication line and a general information output device that reads general information stored in a general information storing device and not addressed to the specific individual and outputs the information via the telecommunication line. The information is output by operating the personal information output control device and the general information output control device according to a request, which is input via the telecommunication line.

15 Claims, 12 Drawing Sheets

COMMUNICATION DEVICE AND STORAGE MEDIUM

This is a Division of application Ser. No. 08/946,661 filed Oct. 7, 1997. The entire disclosure of the prior application(s) is hereby incorporated by reference herein in its entirety.

BACKGROUND OF THE INVENTION

1. Field of Invention

The present invention relates to a communication device provided with a personal information storing device that stores information for a specific individual, which can be input or output via a telecommunication line, and a general information storing device that stores information, which can be input or output via a telecommunication line and which is not addressed to the specific individual.

2. Description of Related Art

Conventional facsimile terminal equipment is provided with plural memory areas called message boxes. Each message box stores information for a specific individual. The memory areas are respectively allocated to a different specific individual. Facsimile data or voice data are stored in the message box by first specifying the number of the message box in an automatic message recording mode and then sending facsimile or voice data via a telephone line from another facsimile terminal, for example.

The specific individual who wants to know the contents of a message addressed to himself/herself directly operates facsimile terminal equipment by a predetermined operation including the input of personal identification numbers to extract the contents of his/her own message box. The specific individual can also access the message box from another facsimile terminal equipment via a telephone line and can retrieve the contents of his/her own message box. If data stored in the memory area corresponding to his/her own message box is facsimile data, it can be printed out on recording paper. If data stored in a memory area corresponding to his/her own message box is voice data, it can be reproduced from a speaker as voice.

Such facsimile terminal equipment is also normally provided with plural memory areas, each of which is called a general mail box, for storing information not addressed to a specific individual. The above facsimile terminal equipment is constituted so that voice data or facsimile data, which is input via a telecommunication line in an automatic message recording mode and which is not addressed to a specific individual, is stored in the general mail box. The contents of the general mail box can be retrieved from another facsimile terminal equipment at a remote location via a telecommunication line. Such facsimile terminal equipment is constituted so that the operation for retrieving a message from the general message box and the operation for retrieving a message from the general mail box are completely independent and both cannot be sequentially executed with a telephone line connected.

Therefore, if both a message stored in the message box for a specific individual and a message stored in the general mail box and not addressed to a specific individual are retrieved via a telephone line utilizing facsimile terminal equipment at a destination, there is a problem that the messages cannot be sequentially retrieved. That is, the telephone receiver must be hung up after the message stored in a message box is retrieved before retrieving the message stored in the general mail box. This complicates message retrieval operations and increases costs.

SUMMARY OF THE INVENTION

The present invention solves the above problems by providing a communication device wherein a message stored in a message box for a specific individual and a message stored in a general mail box not addressed to the specific individual can be retrieved sequentially without releasing a line and by providing a storage medium for storing programs for operating the above communication device.

A communication device disclosed in a first aspect is provided with a personal information storing device that stores information, which can be input or output via a telecommunication line for a specific individual, and a general information storing device that stores information, which can be input or output via the telecommunication line, and is not addressed to a specific individual. The communication device is further provided with a personal information input control device that stores information input via the telecommunication line for a specific individual in the personal information storing device, a personal information output control device that reads information stored in the personal information storing device for a specific individual and that outputs the information via the telecommunication line. The communication device still further includes a general information input control device that stores information input via the telecommunication line and not addressed to a specific individual in the general information storing device, a general information output control device that reads information stored in the general information storing device and not addressed to a specific individual and that outputs the information via the telecommunication line, and an information automatic output device that reads other information and outputs it via the telecommunication line by operating the personal information output control device or the general information output control device when either of information stored in the personal information storing device or the general information storing device is read and output via the telecommunication line.

Therefore, a message stored in the personal information storing device, that is, the message box for a specific individual, and a message stored in the general information storing device, that is, a general mail box, not addressed to a specific individual, can be automatically and sequentially retrieved without releasing the telecommunication line. Accordingly, when both a message stored in the message box and a message stored in the general mail box are retrieved, the second telephoning operation can be eliminated.

The telecommunication line may be a public circuit, a leased line, a wired line or wireless. The personal information storing device and the general information storing device can be volatile memory such as random access memory (RAM) and erasable nonvolatile memory such as an EEPROM. However, the above devices are not limited to the above memory and, for example, a hard disk may be also used. If volatile memory is used, its power supply should be backed up by a battery. The personal information storing device and the general information storing device may be also realized by storage mediums that are physically independent of each other and may be also realized as difference areas in the same storage medium.

The number of provided personal information storing devices is arbitrary. However, if plural devices are provided, specification information for specifying the personal information storing device is required to be input.

For the above communication device, facsimile terminal equipment and a telephone set can be considered. However, the above communication device is not limited to the above and can include, for example, a personal computer, a word processor, and an electronic printer with an aural communication function.

The personal information input control device, the personal information output control device, the general information input control device, the general information output control device and the information automatic output device are realized by operating a central processing unit (CPU) or a microprocessor according to a predetermined program.

From the point of view of maintaining security over the contents stored in the personal information storing device, it is desirable that password information is registered beforehand for every personal information storing device. Further, the password information is additionally required to be input correctly as a condition for operating each personal information output control device.

The personal information input control device and the personal information output control device may also input and output information to/from the personal information storing device according to a predetermined dual tone multiple frequency (DTMF) signal input, for example from a calling terminal via a telecommunication line. The personal information input and output control devices may also input and output information to/from the personal information storing device when requested by the user of a calling terminal. That is, the user of the communication device according to the present invention operates a predetermined key. In the above cases, information may be also input and output to/from the personal information storing device.

The general information input control device, when in an automatic message recording mode, stores information that is input via a telecommunication line, and that is not addressed to a specific individual, in the general information storing device. However, when memory receiving is set, except in the automatic message recording mode, image information input via the telecommunication line and not addressed to a specific individual may be also stored in the general information storing device.

A communication device disclosed in a second aspect is based on the communication device according to the first aspect. An information automatic output device provided with the communication device according to the second aspect reads information stored in the general information storing device and not addressed to a specific individual and outputs it via the telecommunication line by operating the general information output control device when information for a specific individual stored in the personal information storing device is read by the personal information output control device and output via the telecommunication line.

According to the above communication device, when a message stored in the general mail box is retrieved after a message stored in a message box is retrieved, extra labor such as repeat calling can be eliminated in addition to the effect produced by the communication device according to the first aspect. A message stored in the message box, which may be more important than a message stored in the general mail box, can be retrieved in priority over the message stored in the general mail box.

A communication device disclosed in a third aspect is based on the communication device according to the first aspect. The information automatic output device provided with the communication device according to the third aspect reads information stored in the personal information storing device for a specific individual. The information automatic output device outputs the personal information via a telecommunication line by operating the personal information output control device when information stored in the general information storing device, and not addressed to a specific individual, is read by the general information output control device and is output via a telecommunication line.

According to the above communication device, when a message stored in a message box is retrieved after a message stored in a general mail box is retrieved, extra labor such as repeat calling can be saved in addition to the effect produced by the communication device according to the first aspect.

A communication device disclosed in a fourth aspect is based on the communication device according to the first to the third aspects. In the fourth aspect, information stored in the personal information storing device and the general information storing device is also voice information.

According to the above communication device, voice information can be stored in the message box and the general mail box in addition to the effect produced by the communication device according to the first to the third aspects.

A communication device disclosed in a fifth aspect is based on the communication device according to the first to the third aspects. In the fifth aspect, information stored in the personal information storing device and the general information storing device is also image information.

According to the above communication device, image information can be stored in the message box and the general mail box in addition to the effect produced by the communication device according to the first to the third aspects.

A communication device disclosed in a sixth aspect is based on the communication device according to the second aspect, and information stored in the personal information storing device and the general information storing device is voice information and image information. The information automatic output device outputs voice information stored in the general information storing device and not addressed to a specific individual via a telecommunication line after voice information stored in the personal information storing device for a specific individual is output via a telecommunication line. Afterward, the information automatic output device outputs image information stored in the general information storing device and not addressed to a specific individual via a telecommunication line after image information stored in the personal information storing device for a specific individual is output via the telecommunication line.

For a user who receives information, the above communication device is very convenient. That is, if voice information and image information are alternately received, an operation in which image information is printed or displayed, and then the printed or displayed image is seen after voice information is heard, is repeated. The operation repeats because voice information is heard from the speaker of a handset and image information is printed on recording paper or displayed on a display screen. However, if voice information and image information are output together as described above, the repetition is not required, making the method very convenient for a user who receives the information.

A communication device disclosed in a seventh aspect is based on the communication device according to the third aspect. In this aspect, information stored in the personal information storing device and the general information storing device is voice information and image information. The information automatic output device outputs voice information, which is stored in the personal information storing device for a specific individual, via a telecommunication line after voice information, which is stored in the personal information storing device and not addressed to a specific individual, is output via a telecommunication line. The information individual output device then outputs image information, which is stored in the personal information storing device for a specific individual, via a telecommunication line after image information, which is stored in the general information storing device and not addressed to a specific individual, is output via a telecommunication device.

For a user who receives information, the above communication device is very convenient. That is, if voice information and image information are alternately received, an operation in which image information is printed or displayed, and then the printed or displayed image is seen after voice information is heard, is repeated. The operation repeats because voice information is heard from the speaker of a handset and image information is printed on recording paper or displayed on a display screen. However, if voice information and image information are output together as described above, the repetition is not required, making the method very convenient for the user who receives the information.

A communication device disclosed in an eighth aspect is provided with a personal information storing device for storing information, which can be input or output via a telecommunication line for a specific individual, and a general information storing device for storing information, which can be input or output via the telecommunication line and is not addressed to a specific individual. Further, the above communication device is provided with a personal information input control device for storing information, which is input via the telecommunications line for a specific individual, in the personal information storing device, a personal information output control device for reading information stored in the personal information storing device for a specific individual and outputting it via the telecommunication line, a general information input control device for storing information, which is input via the telecommunication line and not addressed to a specific individual, in the general information storing device, a general information output control device for reading information stored in the general information storing device and not addressed to a specific individual and outputting it via the telecommunication line and an information individual output device for reading other information and outputting it via a telecommunication line by operating the personal information output control device or the general information output control device according to a request input via a telecommunication line, when either of information stored in the personal information storing device for a specific individual or information stored in the general information storing device and not addressed to a specific individual, as read by the personal information output control device or the general information output control device and output via a telecommunication line.

According to the above communication device, because the information individual output device reads the other information and outputs it via a telecommunication line by operating the personal information output control device or the general information output control device according to a request input via a telecommunication line when either of information stored in the personal information storing device for a specific individual or information stored in the general information storing device and not addressed to a specific individual is read by the personal information output control device or the general information output control device and output via a telecommunication line, a message stored in the personal information storing device, that is, a message box for a specific individual, and a message stored in the general information storing device, that is, a general mail box, can be sequentially retrieved without releasing a line. Therefore, when both a message stored in a message box and a message stored in a general mail box are retrieved, a requirement for multiple calls to retrieve the data can be avoided. In addition, both a message stored in a message box and a message stored in a general mail box can be retrieved.

A request input via a telecommunication line as a condition for outputting the other information may be a predetermined DTMF signal input from a calling terminal, for example via a telecommunication line, or may also be a predetermined key operation applied by the user of a called terminal when requested by the user of a calling terminal during a conversation. In addition, other information may be also output in both of the above cases.

A communication device disclosed in a ninth aspect is based on the communication device according to the eighth aspect. In this aspect, the information individual output device that reads information, which is stored in the general information storing means and not addressed to a specific individual, and outputs it via a telecommunication line by operating the general information output control device according to a request input via a telecommunication line when information stored in the personal information storing device for a specific individual is read by the personal information output control device and is output via the telecommunication line.

According to the above communication device, when a message stored in a general mail box is retrieved after a message stored in a message box is retrieved, labor such as multiple calls can be saved in addition to the effect produced by the communication device according to the eighth aspect. A message stored in a message box that is more important than a message stored in a general mail box can be retrieved in priority over the message in the general mail box.

A communication device disclosed in a tenth aspect is based on the communication device according to the eighth aspect. In this aspect, the information individual output device reads information, which is stored in the personal information storing device for a specific individual, and outputs it via a telecommunication line by operating the personal information output control device according to a request input via a telecommunication line when information, which is stored in the general information storing device and not addressed to a specific individual, is read by the general information output control device and is output via the telecommunication line.

According to the above communication device, when a message stored in a message box is retrieved after a message stored in a general mail box is retrieved, labor such as multiple calls can be saved in addition to the effect produced by the communication device according to the eighth aspect.

A communication device disclosed in the eleventh aspect is based on the communication device according to the eighth to the tenth aspects. In this aspect, information stored in the personal information storing device and the general information storing device is voice information.

According to the above communication device, voice information can be stored in a message box and a general mail box in addition to the effect produced by the communication device according to the eighth to the tenth aspects.

A communication device disclosed in a twelfth aspect is based on the communication device according to the eighth to the tenth aspects. In this aspect, information stored in the personal information storing device and the general information storing device is image information.

According to the above communication device, image information can be stored in a message box and a general mail box in addition to the effect produced by the communication device according to the eighth to the tenth aspects.

A communication device disclosed in a thirteenth aspect is based on the communication device according to the ninth aspect. In this aspect, information stored in the personal information storing device and the general information storing device is voice information and image information. The information individual output device outputs voice information, which is stored in the general information storing device and not addressed to a specific individual, via a telecommunication line after voice information, which is stored in the personal information storing device for a specific individual is output via the telecommunication line. The information individual output device then outputs image information stored in the general information storing device and not addressed to a specific individual, via a telecommunication line after image information, which is stored in the personal information, which is storing means for a specific individual, is output via the telecommunication line.

For a user who receives information, the above communication device is very convenient. That is, if voice information and image information are alternately received, an operation in which image information is printed or displayed, and then the printed or displayed image is seen after voice information is heard, is repeated. The operation repeats because voice information is heard from the speaker of a handset and image information is printed on recording paper or displayed on a display screen. However, if voice information and image information are output together as described above, the method is very convenient for a user who receives information because the above repetition is not required.

A communication device disclosed in a fourteenth aspect is based on the communication device according to the tenth aspect. In this aspect, information stored in the personal information storing device and the general information storing device is voice information and image information. The information individual output device outputs voice information, which is stored in the personal information storing device for a specific individual, via a telecommunication line after voice information, which is stored in the general information storing device and not addressed to a specific individual, is output via a telecommunication line. The information individual output device then outputs image information, which is stored in the personal information storing device, for a specific individual, via a telecommunication line after image information, which is stored in the general information storing means and not addressed to a specific individual, is output via a telecommunication line.

For a user who receives information, the above communication device is very convenient. That is, if voice information and image information are alternately received, an operation in which image information is printed or displayed, and then the printed or displayed image is seen after voice information is heard, is repeated. The operation repeats because voice information is heard from the speaker of a handset and image information is printed on recording paper or displayed on a display screen. However, if voice information and image information are output together as described above, the method is very convenient for a user who receives information because the above repetition is not required.

A storage medium disclosed in a fifteenth aspect records a program for operating a communication device provided with a personal information storing device for storing information, which can be input or output via a telecommunication line for a specific individual, and a general information storing device for storing information, which can be input or output via the telecommunication line and is not addressed to a specific individual. The storage medium also records a program for enabling an information processor to function as a personal information input control device for storing information, which is input via the telecommunication line for a specific individual in the personal information storing device, a personal information output control device for reading information, which is stored in the personal information storing device for a specific individual and outputting it via the telecommunication line, a general information input control device for storing information, which is input via the telecommunication line and not addressed to a specific individual, in the general information storing device, a general information output control device for reading information, which is stored in the general information storing device and not addressed to a specific individual, and outputting it via the telecommunication line. The storage medium also records a program enabling an information automatic output device to read the other information and outputs it via the telecommunication line by operating the personal information output control device or the general information output control device when either of information stored in the personal information storing device for a specific individual or information stored in the general information storing device and not addressed to a specific individual is read and output via the telecommunication line by the personal information output control device or the general information output control device.

According to the above storage medium, the operation of the communication device according to the first aspect can be realized by operating an information processor according to the recorded program.

A storage medium disclosed in a sixteenth aspect records a program for operating a communication device provided with a personal information storing device for storing information, which can be input or output via a telecommunication line for a specific individual, and general information storing device for storing information, which can be input or output via the telecommunication line and is not addressed to a specific individual. The storage medium also records a program for enabling an information processor to function as personal information input control device for storing information, which is input via the telecommunication line for a specific individual, in the personal information storing means, a personal information output control device for reading information stored in the personal information storing device for a specific individual and outputting it via the telecommunication line. The storage medium further records a program for enabling general information input control device for storing information, which is input via the telecommunication line and not addressed to a specific individual, in the general information storing device, a general information output control device for reading information, which is stored in the general information storing device and not addressed to a specific individual, and outputting it via the telecommunication line, and an information individual output device for reading other information and outputting it via the telecommunication line by operating the personal information output control device or the general information output control device according to a request input via a telecommunication line when either of information stored in the personal information storing device for a specific individual or information stored in the general information storing device and not addressed to a specific individual is read and output via the telecommunication line by the personal information output control device or the general information output control device.

According to the above storage medium, the operation of the communication device according to the eighth aspect can be realized by operating an information processor according to a recorded program.

BRIEF DESCRIPTION OF THE DRAWINGS

A preferred embodiment of the present invention will be described in detail with reference to the following figures wherein like numerals refer to like feature and wherein.

DETAILED DESCRIPTION OF PREFERRED EMBODIMENTS

Figure 1:
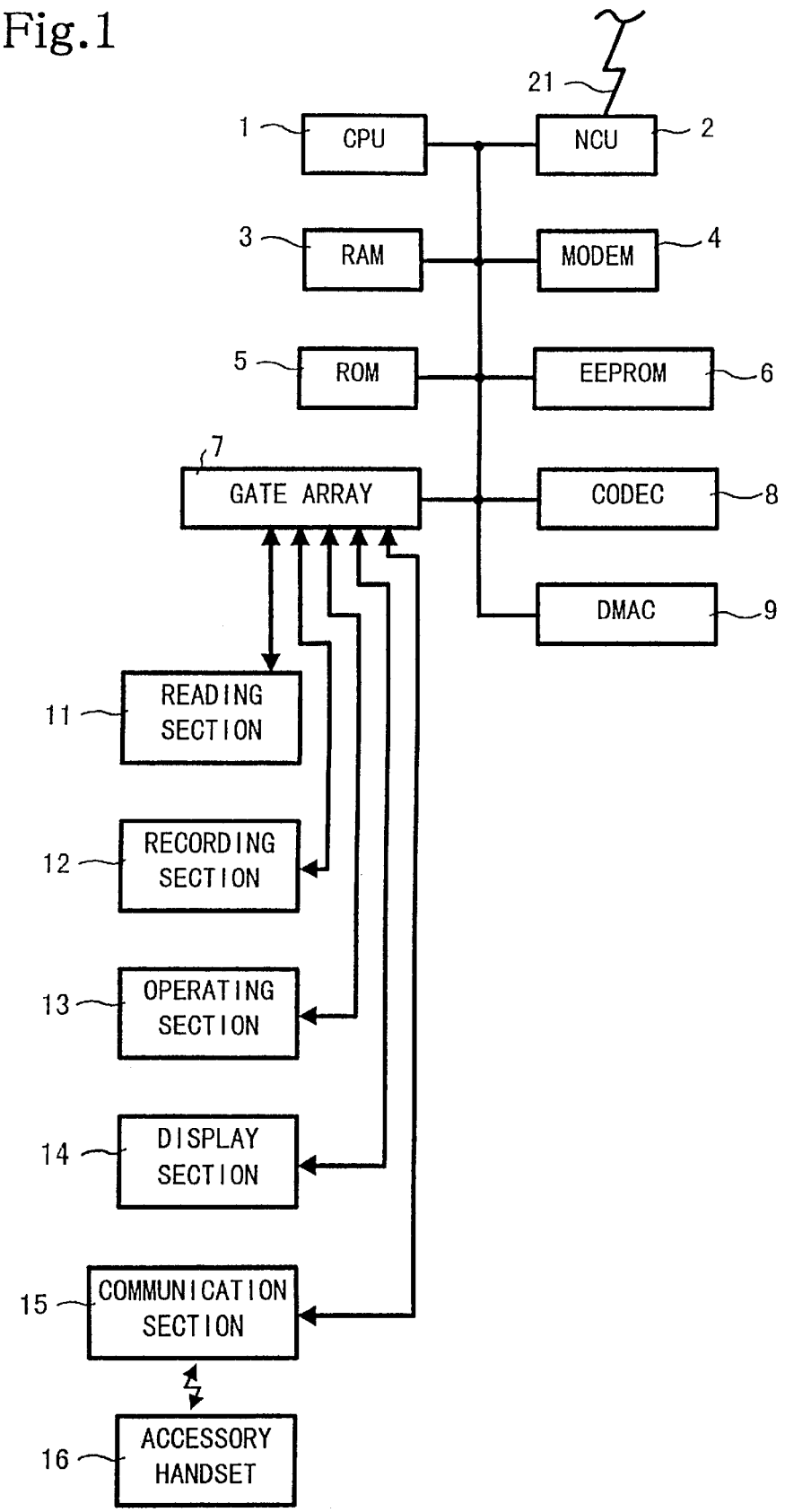
FIG. 1 is a circuit block diagram of facsimile terminal equipment as an example of a communication device according to the present invention.

Referring to the drawings, a preferred embodiment according to the present invention will be described in detail below.

FIG. 1 is a circuit block diagram showing facsimile terminal equipment as an example of a communication device according to the present invention and the above facsimile terminal equipment is provided with a CPU 1, a network control unit (NCU) 2, a RAM 3, a modem 4, a read-only memory (ROM) 5, an erasable programmable ROM (EEPROM) 6, a gate array 7, a coder/decoder (CODEC) 8, a direct memory access controller (DMAC) 9, a reading section 11, a recording section 12, an operating section 13, a display section 14, a communication section 15 and an accessory handset 16. The CPU 1, NCU 2, RAM 3, modem 4, ROM 5, EEPROM 6, gate array 7, CODEC 8 and DMAC 9 are mutually connected via a bus. The bus includes an address bus, a data bus and a control signal conductor. The reading section 11, the recording section 12, the operating section 13, the display section 14 and the communication section 15 are connected to the gate array 7. A telephone line 21 as an example of a telecommunication line is connected to the NCU 2.

The CPU 1 controls the whole facsimile terminal equipment. The NCU 2 is connected to the telephone line 21 to control a network. The RAM 3 is backed up by a power supply (not shown) to store various data. In the RAM 3, a predetermined capacity of personal information storage area for storing information for a specific individual is set. In this embodiment, personal information storage areas for five persons are provided. The modem 4 modulates send data and demodulates receive data. The ROM 5 stores various programs. The EEPROM 6 stores various registered data and flags. The gate array 7 functions as the input/output interface of the CPU 1. The CODEC 8 encodes sending facsimile data and decodes received facsimile data, converts sending voice data to an aural signal and converts a received aural signal to voice data. The DMAC 9 writes or reads data to/from the RAM 3 and the EEPROM 6. The reading section 11 is provided with a light source, a charge coupled device (CCD) sensor, and a manuscript feed motor (not shown). The reading section 11 reads a manuscript and outputs a picture signal. The recording section 12 is provided with a printer such as an ink jet printer and a thermal transfer printer and records a received image on a recording paper. The operating section 13 consists of key switches and outputs a signal according to an operation by a user. The display section 14 consists of a liquid crystal display (LCD) and a light emitting diode (LED) displays. The communication section 15 and the accessory handset 16 mutually communicate by wireless. That is, the accessory handset 16 is provided with a function as a cordless handset and a function as a cordless remote controller for remotely operating the facsimile terminal equipment. A part except the accessory handset 16 of the above facsimile terminal equipment is called a body. The circuit construction of the communication section 15 and the accessory handset 16 is the same as that of a general cordless telephone set and because these devices are well known, their description is omitted.

Figure 2:
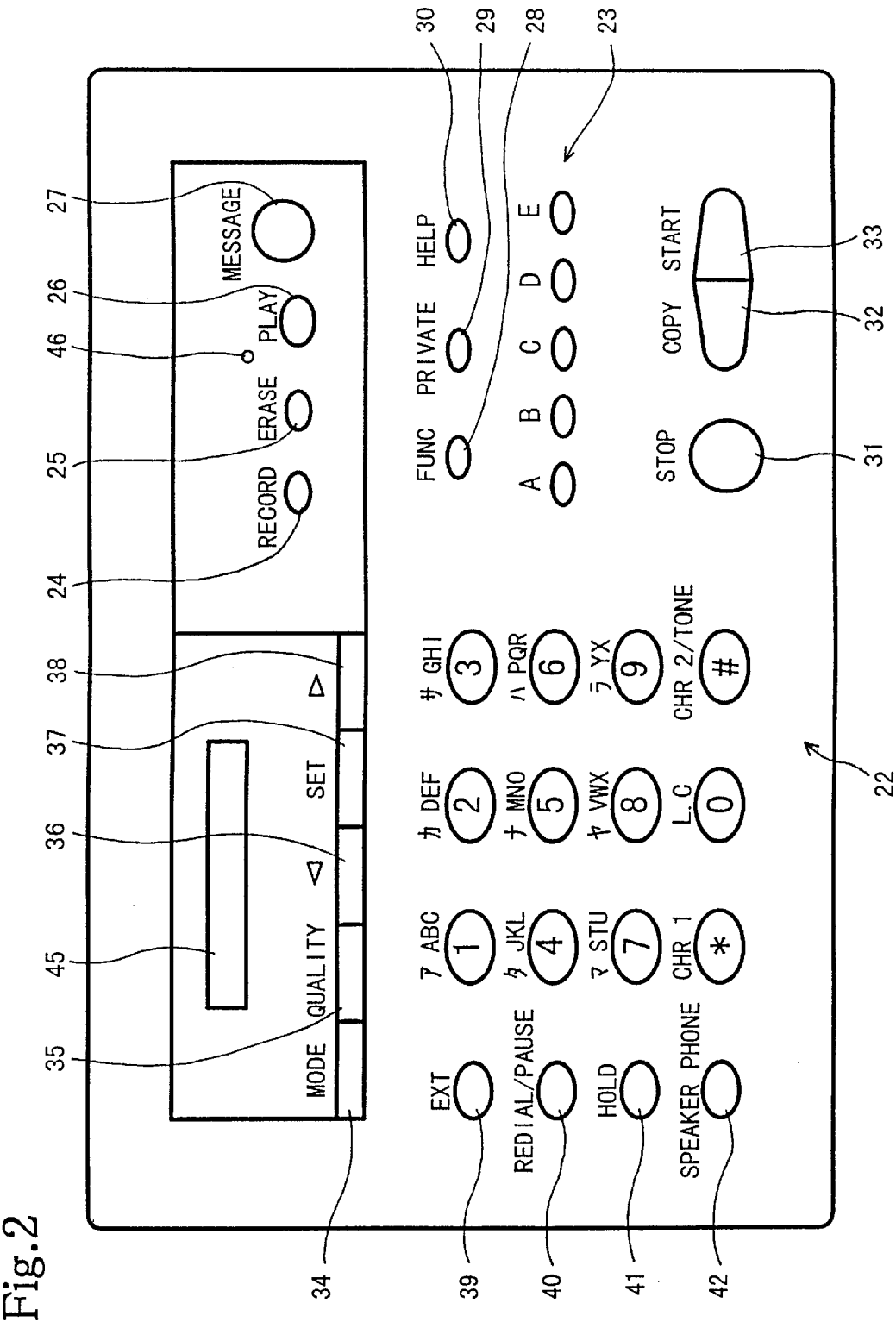
FIG. 2 shows an operator panel provided with the facsimile terminal equipment shown in FIG. 1.

FIG. 2 shows an operator panel for the operating section 13 and the display section 14. On the operator panel, twelve dial keys 22, five box specifying keys 23, a recording key 24, an erase key 25, a reproduction key 26, a message recording mode setting key 27, a function key 28, a private key 29, a help key 30, a stop key 31, a copy key 32, a start key 33, a receive mode key 34, an image quality key 35, a left scroll key 36, a setting key 37, a right scroll key 38, an extension/call-waiting key 39, a redialing/pause key 40, a hold key 41 and a speaker phone key 42 are provided as operating keys. On the operator panel, a LCD 45 for displaying a character, a numeric character, and a symbol and a LED 46 for emitting red light, for example, are also provided as displays.

The dial keys 22 are dial numbers for a user to specify a called party. Specifically, the dial keys are provided to input a telephone number or a facsimile number. The box specifying keys 23 are provided to specify a message box allocated to a specific individual. In this embodiment, five message boxes A to E are provided. The recording key 24 is used when information input via the telephone line 21 shown in FIG. 1 is stored in the RAM 3. The erase key 25 is used when information stored in the RAM 3 is erased. If information stored in the RAM 3 is voice data, a reproduction device outputs the data as voice. If information stored in the RAM 3 is facsimile data, a reproduction device prints the data on the recording paper as an image. The message recording mode setting key 27 sets the operation mode of the facsimile terminal equipment to an automatic message recording mode. The function key 28 executes various setting and registration events. The private key 29 enables access to a message box and the use of a telephone directory function. The help key 30 enables the recording section 12 to print a guide or menu of functions.

The stop key 31 is used to stop facsimile sending. The copy key 32 starts copying. The start key 33 starts facsimile sending. The receive mode key 34 selects a receive mode. The image quality key 35 is provided to select a definition of image quality. The left scroll key 36 moves a cursor, which is displayed on the display screen of the LCD 45, to the left. The setting key 37 defines the contents of setting or registration and others displayed on the display screen of the LCD 45. The right scroll key 38 moves the cursor to the right. The extension/call-waiting key 39 is used for an extension and a call-waiting phone. The redial/pause key 40 is used for redialing and pausing. The hold key 41 is provided to hold an outside line. The speaker phone key 42 switches from an off hook state using a handset (not shown) to an off hook state not using the handset. The LCD 45 displays the contents of registration or setting, the state of operation and others. The LED 46 indicates that a voice message or a facsimile message is stored in a message box for a specific individual or is stored in a general mail box not addressed to a specific individual by, for example, flickering.

Figure 3:
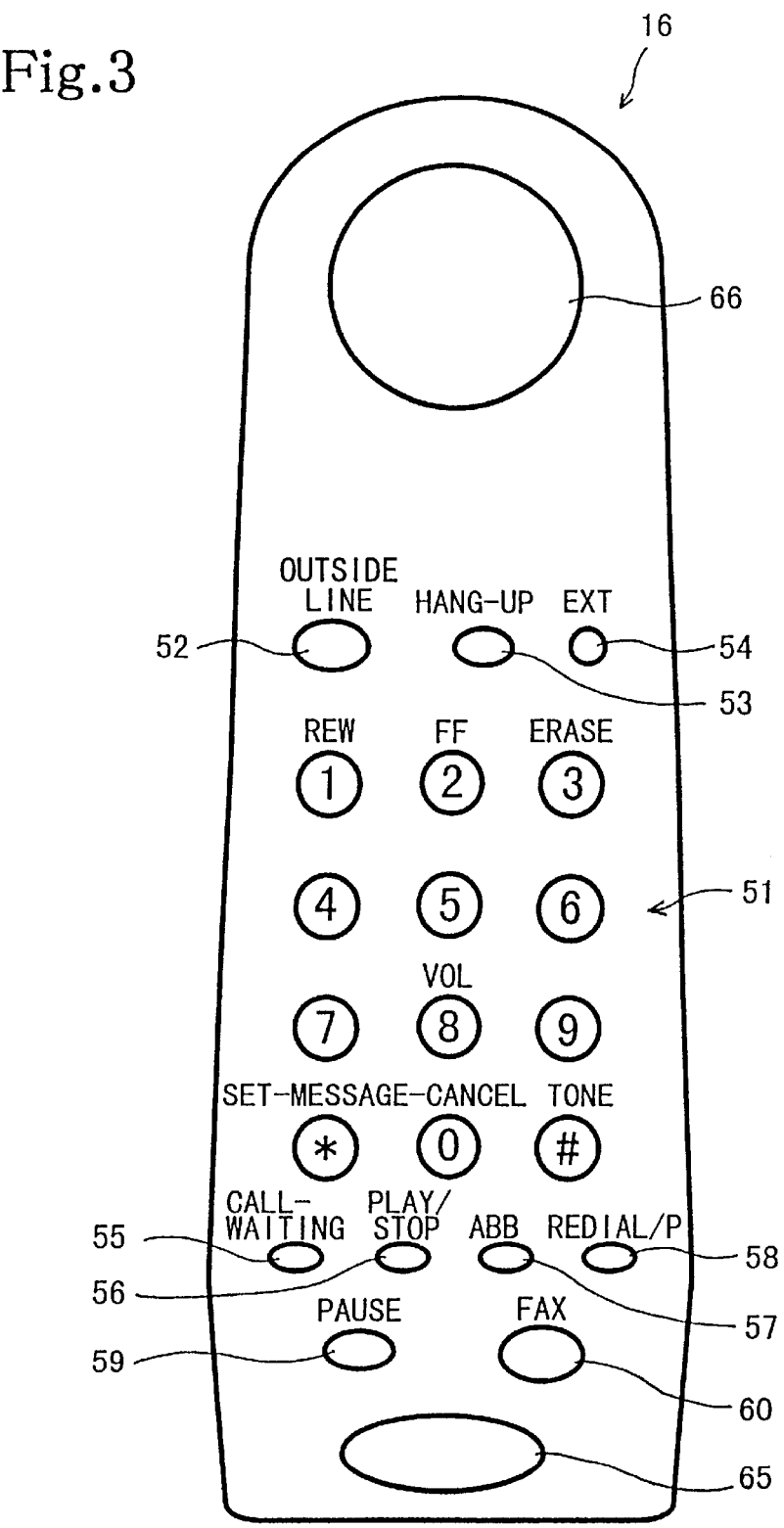
FIG. 3 is a front view showing an accessory handset provided with the facsimile terminal equipment shown in FIG. 1.

FIG. 3 is a front view showing the accessory handset 16. At the front of the accessory handset 16, twelve dial keys 51, an outside line key 52, a hanging-up key 53, an extension key 54, a call-waiting key 55, a reproduction/stop key 56, an abbreviation key 57, a redial/pause key 58, a hold key 59 and a facsimile receiving key 60 are provided as operating keys. Further, at the front of the accessory handset 16, a microphone 65 and a speaker 66 are provided.

The dial keys 51 are dial numbers for a user to specify a called party. Specifically, the dial keys 51 are provided to input a telephone number or a facsimile number. The outside line key 52 is used for access to an outside line. The hanging-up key 53 is used to finish a call. The extension key 54 is used for access to an extension. The call-waiting key 55 is used for a call-waiting phone. The reproduction/stop key 56 reproduces voice information stored in a message box or a general mail box, or stops reproduction. The abbreviation key 57 is provided to use an abbreviated dial. The redial/pause key 58 is used for redialing and pausing. The hold key 59 holds an outside line. The facsimile receiving key 60 receives incoming facsimile. The microphone 65 and the speaker 66 are provided for aural communication.

Figure 4:
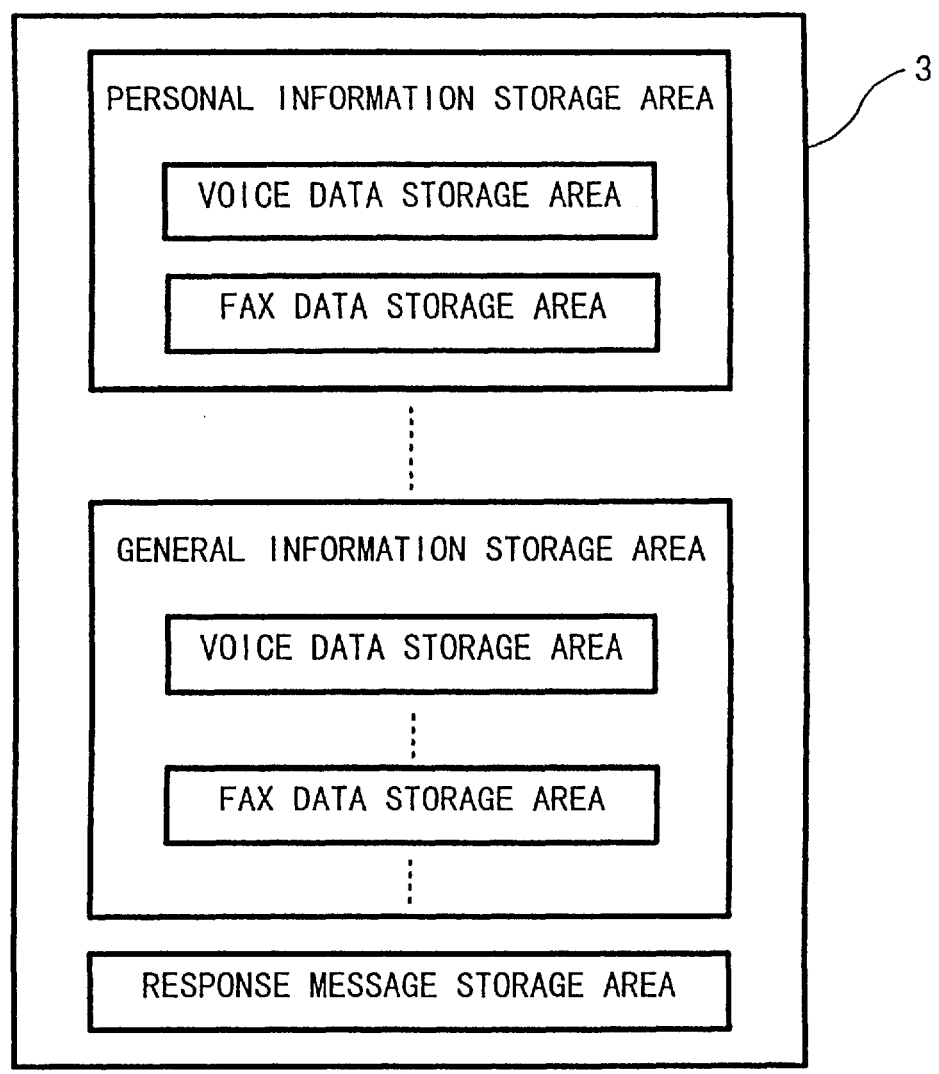
FIG. 4 is a schematic explanatory drawing showing storage areas in a RAM provided with the facsimile terminal equipment shown in FIG. 1.

FIG. 4 is a schematic drawing showing storage areas in the RAM 3. In the RAM 3, a personal information storage area, a general information storage area and a response message storage area are set. In addition, an arbitrary number of areas for storing voice data and facsimile data, which can be freely retrieved from another communication terminal, may be set in the RAM 3 and voice data and facsimile data for advertisement may be stored in one of the arbitrary number of areas. In this embodiment, five personal information storage areas are set. A predetermined capacity of the voice data storage area and a predetermined capacity of the facsimile data storage area are respectively set for each personal information storage area. The storage capacity of each personal information storage area, each voice data storage area and each facsimile data storage area is not individually determined. Instead, the whole personal information storage area is limited to a predetermined capacity. This arrangement provides flexible memory control in which storage capacity can be freely provided in the order of arrival of data. The storage capacity of each voice data storage area and each facsimile data storage area may be also individually fixed. The personal information storage areas are allocated to each specific individual and are used as a message box. That is, voice data or facsimile data sent from another communication terminal, by specifying a message box number, is stored in the corresponding personal information storage area. The voice data and facsimile data are set so that the stored voice data or facsimile data cannot be retrieved unless password information, which only a specific individual who is the owner of the personal information storage area knows, is input. On the other hand, in the general information storage area, a predetermined number of voice data storage areas and facsimile data storage areas are provided, and in the automatic message recording mode, voice data and facsimile data can be freely input from another communication terminal to the general information storage areas without specifying a message box number. In addition, the contents can be freely retrieved without inputting password information. When facsimile receiving is set to memory receiving, facsimile data can be also freely input from another communication terminal. In this embodiment, a general information storage area is called a general mail box. In the response message storage area, voice data for outputting various voice response messages is stored.

Thus, a personal information storage area in the RAM 3 constitutes a personal information storing device for storing information, which can be input or output via the telephone line 21 for a specific individual. A general information storage area in the RAM 3 constitutes general information storing device for storing information, which can be input or output via the telephone line 21 and is not addressed to a specific individual. The CPU 1 comprises the personal information input control device for storing information, which is input via the telephone line 21 for a specific individual, in the personal information storing device, the personal information output control device for reading information, which is stored in the personal information storing device for a specific individual, and outputting it via the telephone line 21, the general information input control device for storing information, which is input via the telephone line 21 and not addressed to a specific individual, in the general information storing device, the general information output control device for reading information, which is stored in the general information storing device and not addressed to a specific individual, and outputting it via the telephone line 21 and the information individual output device for reading information, which is stored in the general information storing device and not addressed to a specific individual, and outputting it via the telephone line 21 by operating the general information output control device according to a request input via the telephone line 21 when information stored in the personal information storing device for a specific individual is read by the personal information output control device and is output via the telephone line 21 by the personal information output control device or the general information output control device by operating according to a program stored in the ROM 5.

The ROM 5 constitutes the storage medium for recording a program that enables an information processor to function as the personal information input control device for storing information input via the telephone line 21 for a specific individual in the personal information storing device, the personal information output control device for reading information stored in the personal information storing device for a specific individual and outputting it via the telephone line 21, the general information input control device for storing information input via the telephone line 21 and not addressed to a specific individual in the general information storing device, the general information output control device for reading information stored in the general information storing device and not addressed to a specific individual and outputting it via the telephone line 21 and the information individual output device for reading other information and outputting it via the telephone line 21 by operating the personal information output control device or the general information output control device according to a request input via a telephone line 21 when either of information stored in the personal information storing device for a specific individual or information stored in the general information storing device and not addressed to a specific individual is read and output via the telephone line 21 by the personal information output control device or the general information output control device.

Next, an outline of the operation of facsimile terminal equipment constituted as described above will be described. The facsimile terminal equipment can access each message box in an automatic message recording mode. When a user hears a ringing tone and lifts a handset in a manual receiving mode, for example, or when a user presses the speaker phone key 42 in a manual receiving mode, for example, voice information or facsimile information input via the telephone line 21 can be stored in the personal information storage area in the RAM 3 or voice information or facsimile information can be fetched from the personal information storage area in the RAM 3 via the telephone line 21 respectively by inputting DTMF signal via the telephone line 21 by the predetermined operation of the operating section 13 by a user or the predetermined operation by a caller. If voice information or facsimile information is fetched from the personal information storage area in the RAM 3 via the telephone line 21, a password registered beforehand corresponding to each personal information storage area is required to be input as a DTMF signal to prevent unauthorized message retrieval.

As an example of the above process, when Mr. A calls facsimile terminal equipment belonging to Mr. B to input a message to Mr. B's message box, the desired message can be stored in Mr. B's message box without hanging up the call in one of at least two ways. First, Mr. A asks Mr. C to execute a predetermined operation (described below) so as to input a message to the message box. Second, Mr. A sends a predetermined DTMF signal by operating Mr. A's facsimile terminal equipment even if Mr. B's facsimile terminal equipment is not set to an automatic message recording mode and Mr. C answers the call. The message may also be voice or an image such as a character.

Referring to the above predetermined operation for the operating section 13 by Mr. C, Mr. C first presses the private key 29, next presses the box specifying key 23 (B) corresponding to Mr. B's message box and finally presses the recording key 24. As a result, the speaker of the handset is turned off, the telephone line 21 is not released even if Mr. C puts the handset on hook, and a facsimile signal or a voice signal input from Mr. A's facsimile terminal equipment via the telephone line 21 is stored in a personal information storage area in the RAM 3 corresponding to Mr. B's message box as facsimile data or voice data.

Mr. A may also operate the facsimile terminal equipment on the calling side in place of the predetermined operation by Mr. C. That is, when Mr. A presses dial keys in the order of [0], [2] and [*], a DTMF signal corresponding to the pressed dial keys is input to the above facsimile terminal equipment via the telephone line 21 and the facsimile terminal equipment is placed in the same state as when Mr. C executes the above predetermined operation. Dial key [2] of the above dial keys [0], [2] and [*] denotes Mr. B's message box. As described above, Mr. A himself can store a message in Mr. B's message box even if Mr. C does not know the predetermined operation.

When Mr. D calls the above facsimile terminal equipment to retrieve the contents of his own message box at his destination, he can retrieve the contents of his own message box without hanging up the call in one of at least two ways. First, Mr. D can ask Mr. E. to execute a predetermined operation so as to output the message from Mr. D's message box. Second, Mr. D can himself send a predetermined DTMF signal to operate facsimile terminal equipment at the destination even if the original facsimile terminal equipment is not set to an automatic message recording mode and Mr. E answers the call. If the above message is a voice message, Mr. D can listen to it from the speaker of the handset of the facsimile terminal equipment at the destination. If the above message is an image message, the image message can be printed on recording paper by the facsimile terminal equipment at the destination and can be displayed on the display screen.

Referring to the predetermined operation for the operating section 13 by Mr. E, Mr. E first presses the private key 29, next presses the box specifying key 23 (D) corresponding to Mr. D's message box and finally presses the reproduction key 26. Mr. D inputs his own personal identification numbers (i.e., password information) by operating dial keys of the facsimile terminal equipment at the destination in a predetermined time. Mr. D's personal identification numbers are input to the above facsimile terminal equipment as a DTMF signal from the facsimile terminal equipment on the calling side via the telephone line 21. As a result, the speaker of the handset is turned off, the telephone line 21 is not released even if Mr. E puts the handset on hook, and facsimile data or voice data stored in the personal information storage area in the RAM 3 corresponding to Mr. D's message box is output as a facsimile signal or a voice signal via the telephone line 21.

Mr. D may also operate the facsimile terminal equipment on the calling side in place of the predetermined operation by Mr. E. That is, a DTMF signal corresponding to pressed dial keys is input to the above facsimile terminal equipment via the telephone line 21 when Mr. D presses dial keys in the order of [0], [4] and [*] and the facsimile terminal equipment is placed in the same state as when the above predetermined operation is executed by Mr. E. At this time, Mr. D is also required to input his own personal identification numbers. Key [4] of the above dial keys [0], [4] and [*] denotes Mr. D's message box.

The above facsimile terminal equipment can also access a general mail box in an automatic message recording mode. When a user hears a ringing tone and lifts a handset in a manual receiving mode, for example, or when a user presses the speaker phone key 42 in a manual receiving mode. for example, voice information or facsimile information input via the telephone line 21 can be stored in the general information storage area in the RAM 3. Further, voice information or facsimile information can be retrieved from the general information storage area in the RAM 3 via the telephone line 21. Retrieval occurs by inputting a DTMF signal via the telephone line 21 by a predetermined operation of the operating section 13 by a user or a predetermined operation by a user on the calling side.

For example, when Mr. A calls the above facsimile terminal equipment to input a message to a general mail box, the desired message can be stored in the general mail box without hanging up the call by asking Mr. C to execute a predetermined operation so as to input the message to the general mail box or by Mr. A sending a predetermined DTMF signal using Mr. A's operating facsimile terminal equipment even if the above facsimile terminal equipment is not set to an automatic message recording mode and Mr. C answers the call. The above message may be also voice and may be also an image such as a character.

Referring to the predetermined operation for the operating section 13 by Mr. C, for example, Mr. C presses the private key 29 and next presses the recording key 24. As a result, the telephone line 21 is not released even if Mr. C puts the handset on hook, and a facsimile signal or a voice signal input from Mr. A's facsimile terminal equipment via the telephone line 21 is stored as facsimile data or voice data in the general information storage area in the RAM 3 corresponding to the general mail box.

Mr. A may also operate the facsimile terminal equipment on the calling side in place of the predetermined operation by Mr. C. For example, a DTMF signal corresponding to pressed dial keys is input to the above facsimile terminal equipment via the telephone line 21 when Mr. A presses dial keys in the order of [0] and [*] and the facsimile terminal equipment is placed in the same state as when the above predetermined operation is executed by Mr. C.

When Mr. D calls the above facsimile terminal equipment to retrieve the contents of the general mail box at his destination, he can retrieve the contents of the general mail box without hanging up the call in one of at least two ways. First, Mr. D asks Mr. E to execute a predetermined operation so as to output messages from the general mail box. Second, Mr. D sends a predetermined DTMF signal to operate facsimile terminal equipment at the destination even if the original facsimile terminal equipment is not set to an automatic message recording mode and Mr. E answers the call. If the above message is a voice message, Mr. D can listen to it from the speaker of the handset of the facsimile terminal equipment at the destination. If the above message is an image message, the image message can be printed on recording paper and can be displayed on the display screen respectively by the facsimile terminal equipment at the destination.

Referring to the predetermined operation of the operating section 13 by Mr. E, for example, Mr. E presses the private key 29 and next presses the reproduction key 26. As a result, the telephone line 21 is not released even if Mr. E puts the handset on hook. Facsimile data or voice data stored in the general information storage area in the RAM 3 corresponding to the general mail box are output as a facsimile signal or a voice signal via the telephone line 21.

Mr. D may also operate the facsimile terminal equipment on the calling side in place of the predetermined operation by Mr. E. That is, a DTMF signal corresponding to pressed dial keys is input to the above facsimile terminal equipment via the telephone line 21 when Mr. D presses dial keys in the order of [0] and [*] and the facsimile terminal equipment is placed in the same state as when the above predetermined operation is executed by Mr. E.

As described above, access to a general mail box is enabled by the same operation as an operation for access to a message box except that no operation to specify the number of the message box is executed.

The above facsimile terminal equipment is provided with a telephone directory function for automatically calling by retrieving or specifying any of the telephone numbers of plural desired parties registered beforehand together with the names of the parties. In this operation, the box specifying key 23 is also used as a key for touch tone dialing. That is, each telephone number for touch tone dialing is registered for five box specifying keys 23 and a telephone number corresponding to a pressed box specifying key 23 is automatically called by selecting any box specifying key 23 and pressing it once.

As described above, access to a general mail box is enabled by the same operation as an operation for access to a message box except that no operation to specify the number of the message box is executed.

Next, referring to flowcharts shown in FIGS. 5 to 10, the procedure of receiving processing in each operation mode by the above facsimile terminal equipment will be described.

Figure 5:
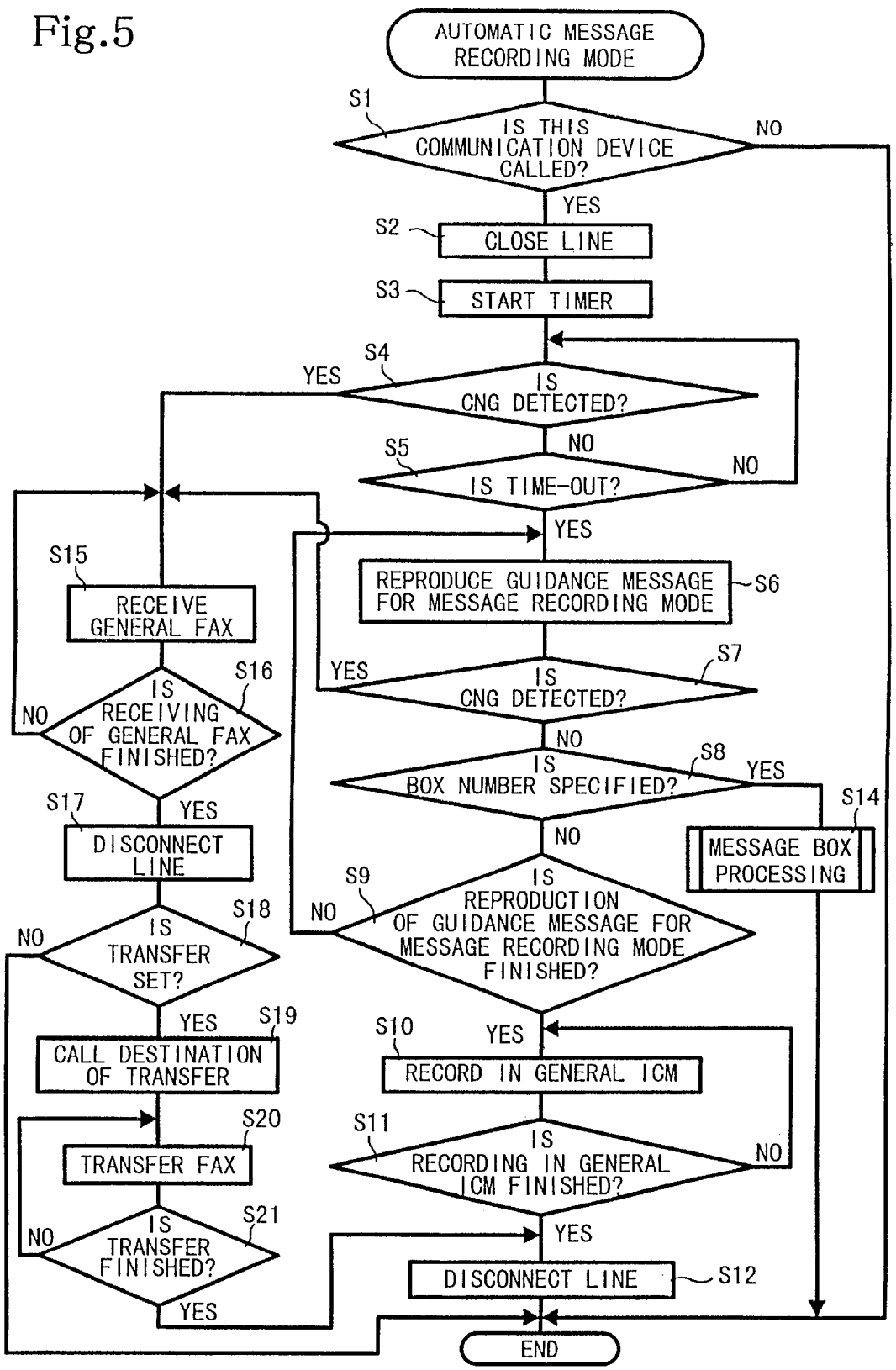
FIG. 5 is a flowchart for explaining the procedure of receiving processing in an automatic telephone message recording mode by the facsimile terminal equipment shown in FIG. 1.

In the automatic message recording mode, as shown in FIG. 5, the CPU 1 judges whether the facsimile terminal equipment is called or not (S1).

If the facsimile terminal equipment is called (S1: YES), the CPU 1 closes a line by controlling the NCU 2 and makes the facsimile terminal equipment receive (S2). At this time, if a message box is set on, nonringing receiving in which a calling bell is not rung, is executed independently of the set frequency of a calling bell. If a message box is set off, ringing receiving in which a calling bell is rung according to its set frequency is executed. The above calling bell is also output from the speaker 66 of the accessory handset 16. When a message box is set off, access to the message box is disabled. Next, the CPU 1 starts a timer (S3). The timer determines a time to detect whether the CNG signal showing facsimile sending is sent from a calling terminal and for example, is set to four seconds. Next, the CPU 1 judges whether the CNG signal is detected (S4). That is, the CPU 1 checks whether the CNG signal is input via the telephone line 21.

If the CNG signal is not detected (S4: NO), the CPU 1 judges whether time measured by the timer started in S3 is up (S5).

If the time measured by the timer is up (S5: YES), the CPU 1 judges that there is no facsimile receiving because the above means that the CNG signal is not input in the predetermined time. The CPU then starts the reproduction of a guidance message for the automatic message recording mode (S6). That is, voice data corresponding to the guidance message for the automatic message recording mode is read from the response message storage area in the RAM 3. The voice data is converted to an aural signal by the CODEC 8 and is sent to the telephone line 21 via the NCU 2. Next, the CPU 1 judges whether the CNG signal is detected (S7).

If the CNG signal is not detected (S7: NO), the CPU 1 judges whether a message box number is specified (S8). That is, the DTMF signal corresponding to the pressed dial keys 22 is input via the telephone line 21 when the dial keys 22 are pressed to specify a message box number at a calling terminal, and the CPU 1 judges whether the DTMF signal is input. The box specifying keys 23 (A to E) of the facsimile terminal equipment respectively correspond to each message box. The message boxes respectively correspond to the dial keys 1 to 5 of the calling terminal for example. Therefore, a desired message box is specified by pressing any of the dial keys 1 to 5 in place of pressing any of the box specifying keys 23 (A to E) on the side of the calling terminal. For example, the dial keys of the calling terminal are pressed in the order of [0], [1] and [*] in place of the box specifying key 23 (A).

If the box number is not specified (S8: NO), the CPU 1 judges whether the reproduction, started in S6, of the guidance message for the automatic message recording mode is finished (S9).

If the reproduction of the guidance message is finished (S9: YES), the CPU 1 judges that the type of an incoming message is a message of general voice information, not addressed to a specific individual, because the CNG signal is not detected and, in addition, no number of a message box is specified during the reproduction of the guidance message for the automatic message recording mode. The CPU 1 then records the incoming message in the general information storage area (S10). In operation, the CPU 1 converts the aural signal input via the telephone line 21 to digital voice data using the CODEC 8 and stores the voice data in a voice data storage area of any general information storage area in the RAM 3. The CPU 1 always judges during the reproduction of the guidance message for the automatic message recording mode, whether the CNG signal and the DTMF signal for specifying a message box number are detected. That is, a period for reproducing the guidance message for the automatic message recording mode normally includes the time in which the guidance message is actually sent and the time following without a sound. The CPU 1 checks whether the CNG signal or the DTMF signal is detected during this period. Next, the CPU 1 judges whether the recording of the incoming message in the information storage area general is finished (S11).

If the recording of the incoming message in the general information storage area is finished (S11: YES), the CPU 1 disconnects the line (S12) and terminates the routine.

In S11, if the recording of the incoming message in the general information storage area is not finished (S11: NO), processing returns to S10 and recording of the incoming message continues.

In S9, if the reproduction of the guidance message for the automatic message recording mode is not finished (S9: NO), processing returns to S6 and the reproduction of the guidance message for the automatic message recording mode continues.

In S8, if the box number is specified (S8: YES), the CPU 1 executes message box processing (S14) because the above means that the message is a message addressed to a specific individual. The CPU 1 then terminates the routine. The above message box processing will be described later in detail.

In S7, if the CNG signal is detected (S7: YES), the CPU 1 executes general facsimile receiving because the above means facsimile receiving that is not addressed to a specific individual (S15). In S15, the CPU 1 stores facsimile data received via the telephone line 21 in a facsimile data storage area in any general information storage area in the RAM 3. Next, the CPU 1 judges whether the general facsimile receiving is finished (S16).

If the general facsimile receiving is finished (S16: YES), the CPU 1 disconnects the line (S17) and judges whether transfer is set on (S18).

If transfer is set on (S18: YES), the CPU 1 calls a communication terminal of a transfer destination (Sl9). The CPU 1 then sends the facsimile data received in S15 (S20). That is, as in the automatic message recording mode, received facsimile data is stored in a facsimile data storage area of any general information storage area in the RAM 3. The CPU 1 transfers the facsimile data to a communication terminal having a telephone number registered beforehand. Transfer is set on or off and a telephone number is registered beforehand by a user pressing a predetermined key, such as the function key 28.

Next, the CPU 1 judges whether the transfer is finished (S21). If the transfer is finished (S21: YES), processing proceeds to S22. The CPU 1 then disconnects the line and terminates the routine.

In S21, if the transfer is not finished (S21: NO), processing returns to S20 and the transfer continues.

In S18, if transfer is not set on (S18: NO), the routine terminates because no transfer is required.

In S16, if the general facsimile receiving is not finished (S16: NO), processing returns to S15 and the general facsimile receiving continues.

In S5, if time measured by the timer started in S3 is not up (S5: NO), processing returns to S4 and the detection of the CNG signal continues.

In S4, if the CNG signal is detected (S4: YES), processing proceeds to S15 because the above means that facsimile data is automatically sent by a calling terminal and processing after the general facsimile receiving is executed.

In S1, if the facsimile terminal equipment is not called (S1: NO), the routine ends.

Figure 6:
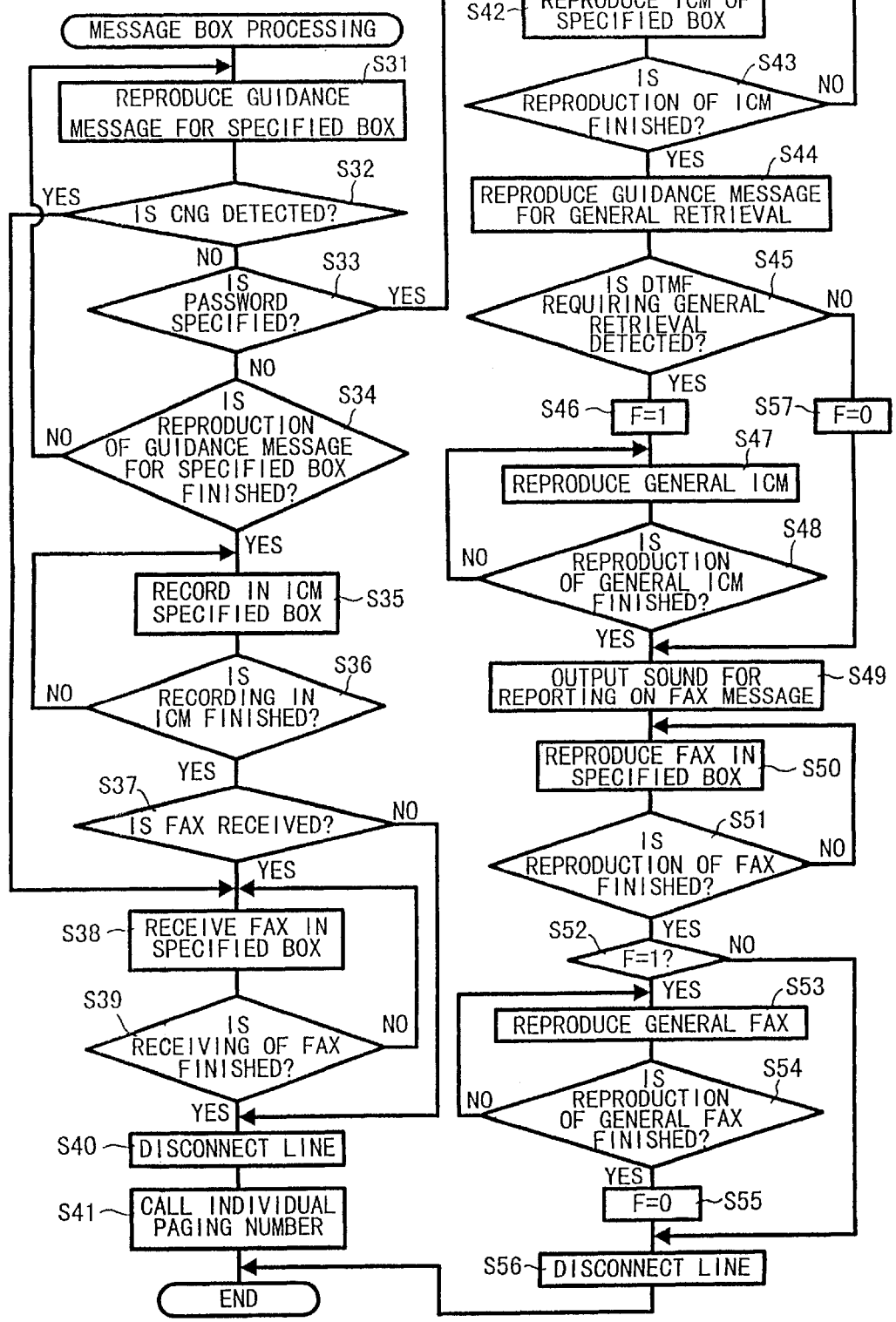
FIG. 6 is a flowchart for explaining the details of the procedure of message box processing in the flowchart shown in FIG. 5.

Next, the procedure of the message box processing shown in S14 in FIG. 5 will be described. In the message box processing, as shown in FIG. 6, the CPU 1 starts the reproduction of a guidance message for a message box specified by the DTMF signal (S31) . That is, the CPU 1 reads voice data corresponding to the guidance message for the specified message box from the response message storage area in the RAM 3. The CPU 1 converts the voice data to an aural signal using the CODEC 8 and sends the aural signal to a calling terminal via the telephone line 21. During this time, no sound is output from any speaker including a speaker of a handset provided with the body, a speaker provided with the operating panel 20, and the speaker 66 of the accessory handset 16. Next, the CPU 1 judges whether the CNG signal is detected (S32). That is, the CPU 1 checks whether the CNG signal is received via the telephone line 21.

If the CNG signal is not detected (S32: NO), the CPU 1 judges whether a password is specified (S33). That is, the CPU 1 checks whether personal identification numbers corresponding to the specified message box are correctly input as the DTMF signal. This check is executed to prevent a person who does not know the personal identification numbers from retrieving the contents of the message box. If no password is specified (S33: NO), the CPU 1 judges whether the reproduction of the guidance message for the message box specified by the DTMF signal is finished (S34).

If the reproduction of the guidance message for the message box specified by the DTMF signal is finished (S34: YES), the CPU 1 judges the input to the message box to be a voice message because the above means that the CNG signal and the DTMF signal corresponding to the personal identification numbers are input during the reproduction of the guidance message. Then, the CPU 1 starts recording the incoming message in the personal information storage area of the specified message box (S35). In operation, the CODEC 8 converts an aural signal input via the telephone line 21 to digital voice data. The CPU 1 then stores the voice data in the voice data storage area of the personal information storage area corresponding to the specified message box in the RAM 3. Next, the CPU 1 judges whether recording of the incoming message in the personal information storage area is finished (S36).

If recording of the incoming message is finished (S36: YES), the CPU 1 judges whether facsimile data is received (S37).

If facsimile data is received (S37: YES), the CPU 1 stores the received facsimile data in the specified message box (S38). In operation, the modem 4 demodulates the received facsimile signal. The CPU 1 then stores the demodulated facsimile data in the facsimile data storage area in the personal information storage area corresponding to the specified message box in the RAM 3. Next, the CPU 1 judges whether the receiving of the facsimile data is finished (S39).

If the receiving of the facsimile data is finished (S39: YES), the CPU 1 disconnects the line (S40). If individual paging is set on, the CPU 1 calls the individual paging number (S41) and then terminates the routine. If individual paging is set off, the individual paging number is not called and the routine terminates. The above individual paging number is the telephone number of a communication terminal, which is to be informed via the telephone line 21 that a message is input in a message box. One or plural individual paging numbers are set for every message box. If a message is input in a message box, the CPU 1 calls the above telephone number and automatically provides an indication that a message exists. For example, a character or a symbol is displayed on the display screen of a pager, facsimile terminal equipment, and a telephone set, which are communication terminals, to indicate that a message is input in a message box. In addition to reporting that a message is input in a message box, the message itself may be also sent if a communication terminal at the message destination is capable of receiving messages. For example, if a communication terminal of the destination is a pager or a telephone set not provided with a function for receiving facsimile data, a facsimile message cannot be sent.

In S39, if the receiving of facsimile data is not finished (S39: NO), processing returns to S38 and the receiving of the facsimile data continues.

In S37, if facsimile data is not received (S37: NO), processing proceeds to S40 because facsimile data is not required to be stored in a message box and processing after the disconnection of the line is executed.

In S36, if recording of the incoming message in the personal information storage area is not finished (S36: NO), processing returns to S35 and recording of the incoming message in the personal information storage area continues.

In S34, if the reproduction of the guidance message for the message box specified by the DTMF signal is not finished (S34: NO), processing returns to S31 and the reproduction of the guidance message continues.

In S33, if a password is specified (S33: YES), that is, if the DTMF signal corresponding to the personal identification numbers of the specified message box is input, the CPU 1 reproduces the contents of personal information storage area of the specified message box (S42). The CODEC 8 converts voice data, which is stored in the voice data storage area of the personal information storage area corresponding to the specified message box in the RAM 3, to an analog aural signal. The CPU 1 then sends the aural signal to the telephone line 21 via the NCU 2. Next, the CPU 1 judges whether reproducing the contents of the personal information storage area of the specified message box is finished (S43).

If reproducing is finished (S43: YES), the CPU 1 reproduces a guidance message for general retrieval (S44) by reading voice data corresponding to the guidance message for general retrieval stored in the response message storage area in the RAM 3. The CODEC 8 the converts the voice data to an analog aural signal and send the aural signal to the telephone line 21 via the NCU 2. The above operation is executed to check whether a user of a calling terminal wants to extract not only a message stored in a message box, but also a message stored in the general mail box not addressed to a specific individual. Next, the CPU 1 judges whether the DTMF signal showing that general retrieval is required is input (S45).

If the DTMF signal that shows that general retrieval is required is input in the predetermined time since the start of reproducing the guidance message for general retrieval (S45: YES), the CPU 1 sets a flag F to "1" (S46) and starts to reproduce the contents of the general personal information storage area (S47). First, the CPU 1 reads voice data stored in a voice data storage area of any general information storage area in the RAM 3. The CODEC 8 then converts the voice data to an analog aural signal. Finally, the CPU 1 sends the aural signal to the telephone line 21 via the NCU 2. As described above, reading data stored in a general information storage area is called general retrieval. Next, the CPU 1 judges whether the reproduction of the contents of general personal information storage area is finished (S48).

If the reproduction of the contents of the general personal information storage area is finished (S48: YES), the CPU 1 outputs a sound for reporting a facsimile message. First, the CPU 1 reads voice data, corresponding to a report message stored in the response message storage area in the RAM 3, that facsimile data will be sent. Then the CODEC 8 converts the voice data to an analog aural signal. Finally, the CPU 1 sends the aural signal to the telephone line 21 via the NCU 2. In this way, a user of a calling terminal starts facsimile receiving by pressing the start key of the calling terminal.

Next, the CPU 1 reproduces the contents of the specified message box in the form of facsimile data (S50). First, the modem 4 modulates facsimile data stored in a facsimile data storage area in a personal information storage area corresponding to the specified message box in the RAM 3. Then the CPU 1 sends the facsimile signal to the telephone line 21 via the NCU 2. Next, the CPU 1 judges whether reproducing the contents of the specified message box in the form of facsimile data is finished (S51).

If reproducing the contents of the specified message box in the form of facsimile data is finished (S51: YES), the CPU 1 judges whether the flag F is "1" (S52).

If the flag F is set to "1" (S52: YES), the CPU 1 starts the reproduction of the contents of the general mail box in the form of facsimile data because the above means that a request for retrieving the contents of the general mail box is made from a calling terminal (S53). First, the CPU 1 reads facsimile data stored in a facsimile data storage area of any general information storage area in the RAM 3. Then the modem 4 modulates the facsimile data and sends the facsimile data to the telephone line 21 via the NCU 2. Next, the CPU 1 judges whether the reproduction of the contents of the general mail box in the form of facsimile data is finished (S54).

If the reproduction of the contents of the general mail box in the form of facsimile data is finished (S54: YES), the CPU 1 sets the flag F to "0" (S55), disconnects the line (S56) and terminates the routine.

In S54, if the reproduction of the contents of the general mail box in the form of facsimile data is not finished (S54: NO), processing returns to S53 and the reproduction of the contents of the general mail box in the form of facsimile data continues.

In S52, if the flag F is not set to "1" (S52: NO), the contents of the general mail box in the form of facsimile data is not reproduced. Then, processing proceeds to S56 because the above means that a request for retrieving the contents of the general mail box is not made from the calling terminal.

In S51, if the reproduction of the contents of the specified message box in the form of facsimile data is not finished (S51: NO), processing returns to S50 and the reproduction of the contents of the specified message box in the form of facsimile data continues.

In S48, if the reproduction of the contents of the general personal information storage area is not finished (S48: NO), processing returns to S47 and the reproduction of the contents of the general personal information storage area continues.

In S45, if the DTMF signal requiring general retrieval in the predetermined time since the start of the reproduction of the guidance message for general retrieval is not input (S45: NO), the CPU 1 sets the flag F to "0" (S57) and processing proceeds to S49 without reproducing the contents of the general personal information storage area.

In S43, if reproducing the contents of personal information storage area of the specified message box is not finished (S43: NO), processing returns to S42 and reproducing the contents of personal information storage area of the specified message box continues.

In S32, if the CNG signal is detected (S32: YES), processing proceeds to S38 without recording in the information storage area because the above means that a user of a calling terminal wants to leave only a facsimile message in the specified message box.

In the above embodiment, if the DTMF signal, which is set so that it reproduces a guidance message for general retrieval (S44) and requires general retrieval in the predetermined time from the start of reproducing the guidance message, is input (S45:YES), the general information is reproduced (S44) or general facsimile data is reproduced (S53). However, even if the DTMF signal, set so that it requires general retrieval, is not input, general information may also be automatically reproduced after reproducing information of a message box. Further, general facsimile data may also be automatically reproduced after reproducing facsimile data of the message box.

Figure 7:
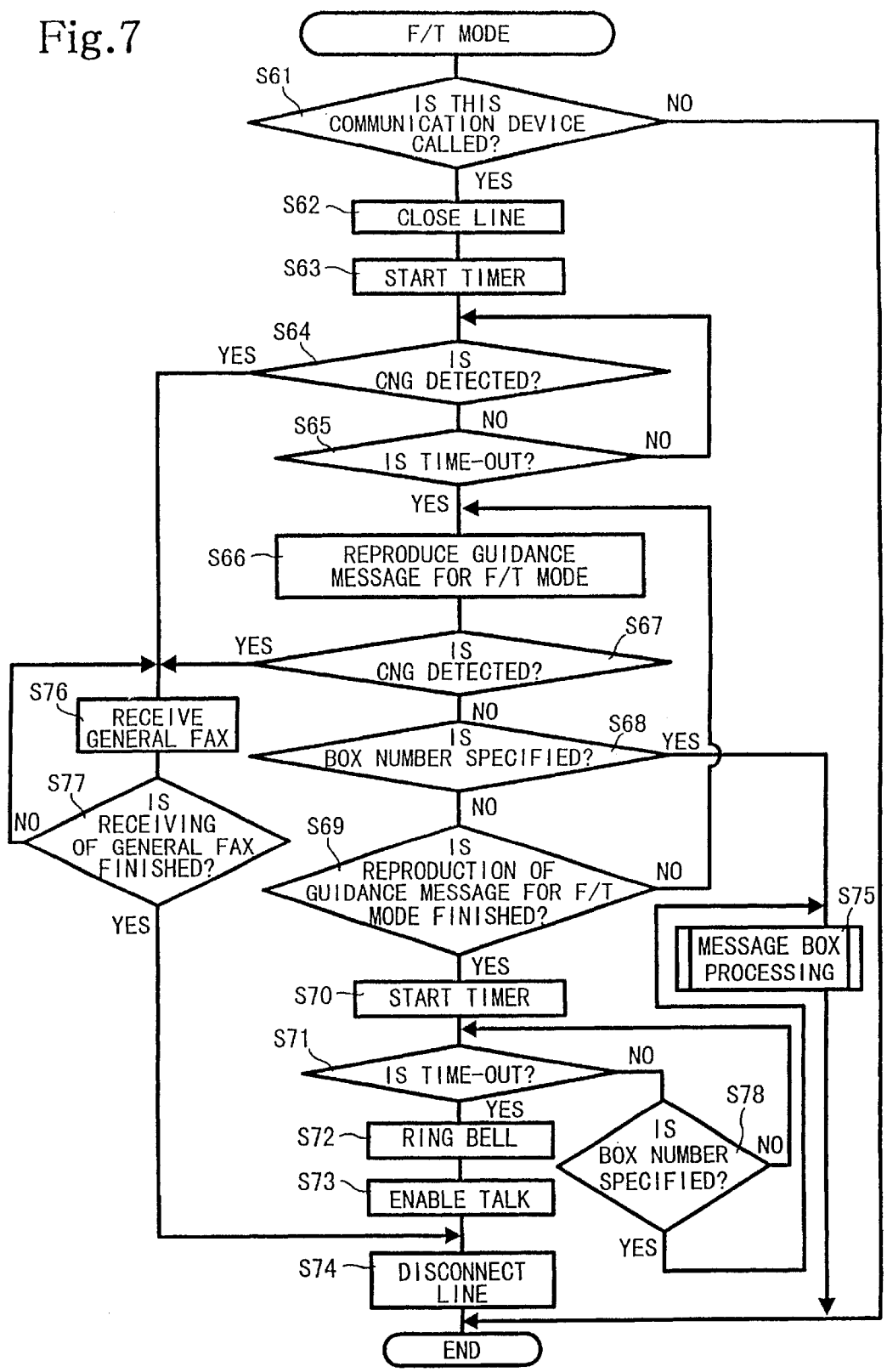
FIG. 7 is a flowchart for explaining the procedure of receiving processing in facsimile/telephone mode by the facsimile terminal equipment shown in FIG. 1.

Next, receiving processing in an automatic switching mode between a facsimile and a telephone (hereafter F/T) mode will be described. In the F/T mode, as shown in FIG. 7, the CPU 1 judges whether the facsimile terminal equipment is called (S61).

If the above equipment is called (S61: YES), the CPU 1 controls the NCU 2 to close a line and receive (S62). At this time, if the message box is set on, nonringing receiving, in which no calling bell is rung, is executed independently of a set frequency of the calling bell. If the message box is set off, ringing receiving, in which the calling bell is rung according to the set frequency of the calling bell, is executed. The calling bell is also output from the speaker 66 of the accessory handset 16. Next, the CPU 1 starts a timer (S63). The timer sets the time to detect the CNG signal from the calling terminal. For example, the time is set to four seconds. Next, the CPU 1 judges whether the CNG signal is detected (S64). That is, the CPU 1 checks whether the CNG signal is input via the telephone line 21.

If the CNG signal is not detected (S64: NO), the CPU 1 judges whether the time measured by the timer started in S63 is up (S65).

If the time is up (S65: YES), the CPU 1 judges that the incoming message is not a facsimile because the CNG signal is not input in a predetermined time. The CPU 1 then starts the reproduction of a guidance message for the F/T mode (S66). That is, the CPU 1 reads voice data corresponding to the guidance message for the F/T mode from the response message storage area in the RAM 3. The CODEC 8 converts the voice data to an aural signal. Then the CPU 1 sends the aural signal to the telephone line 21 via the NCU 2. Next, the CPU 1 judges whether the CNG signal is detected (S67).

If the CNG signal is not detected (S67: NO), the CPU 1 judges whether a box number is specified (S68) That is, because the DTMF signal corresponding to pressed dial keys is input via the telephone line 21 when the dial keys are pressed to specify the message box number on the side of the calling terminal, the CPU 1 judges whether the DTMF signal is input. The box specifying keys 23 (A to E) of the above facsimile terminal equipment respectively correspond to each message box. The message boxes respectively correspond to the dial keys 1 to 5 of the calling terminal, for example. Therefore, the desired message box is specified on the side of the calling terminal by pressing any of the dial keys 1 to 5 in place of pressing any of the box specifying keys 23 (A to E). For example, the dial keys of the calling terminal are pressed in the order of [0], [1] and [*] in place of the box specifying key 23 (A).

If a box number is not specified (S68: NO), the CPU 1 judges whether the reproduction started in S66 of the guidance message for the F/T mode is finished (S69).

If the reproduction of the guidance message for the F/T mode is finished (S69: YES), the CPU 1 starts a second timer (S70) and judges whether the time measured by the second timer is up (S71). The second timer is different from the timer started in S63, in that it affords the user of the calling terminal time for specifying the message box number after the reproduction of the guidance message for F/T mode is finished. For example, time measured by the second timer is up in two seconds.

If the time measured by the second timer started in S70 is up (S71: YES), the CPU 1 rings the calling bell (S72). When the user in response to the calling bell lifts the handset, presses the speaker phone key 42 or presses the outside line key 52 of the accessory handset 16, conversation is enabled (S73). When the conversation is finished, the CPU 1 disconnects the line (S74) and terminates the routine.

In S71, if the time measured by the second timer started in S70 is not up (S71: NO), the CPU 1 judges whether the box number is specified (S75). If the box number is specified (S75: YES), processing proceeds to S75 to execute message box processing. If the box number is not specified (S75: NO), processing returns to S71 to wait until the box number is specified or the time measured by the second timer is up.

In S69, if the reproduction of the guidance message for the F/T mode is not finished (S69: NO), processing returns to S66 and the reproduction of the guidance message for the F/T mode continues.

In S68, if the box number is specified (S68: YES), the CPU 1 executes message box processing (S78) because the above means that the message is addressed to a specific individual. The CPU 1 then terminates the routine. The above message box processing is the same as that shown in FIG. 6.

In S67, if the CNG signal is detected (S67: YES), the CPU 1 executes general facsimile receiving (S76) because the above means that facsimile not addressed to a specific individual is received. When the CPU 1 executes general facsimile receiving (S76), if memory receiving is set, facsimile data received via the telephone line 21 is stored in the facsimile data storage area of any general information storage area in the RAM 3. If memory receiving is not set, facsimile data received via the telephone line 21 is recorded on recording paper by the recording section 12. Next, the CPU 1 judges whether general facsimile receiving is finished (S77).

If general facsimile receiving is finished (S77: YES), processing proceeds to S74, the line is disconnected and the routine terminates.

In S77, if general facsimile receiving is not finished (S77: NO), processing returns to S76 and general facsimile receiving continues.

In S65, if the time measured by the timer started in S63 is not up (S65: NO), processing returns to S64 and the detection of the CNG signal continues.

In S64, if the CNG signal is detected (S64: YES), processing proceeds to S76 because detection of the CNG signal means that automatic sending of facsimile data is then executed in the calling terminal. Processing after general facsimile receiving is. then executed.

In S61, if the facsimile terminal equipment is not called (S61: NO), the routine terminates.

In the above the F/T mode, even during the conversation in S73, processing can proceed to the message box processing in S78 by a user pressing any of the box specifying keys 23 or pressing any of the dial keys on the side of the calling terminal.

Figure 8:
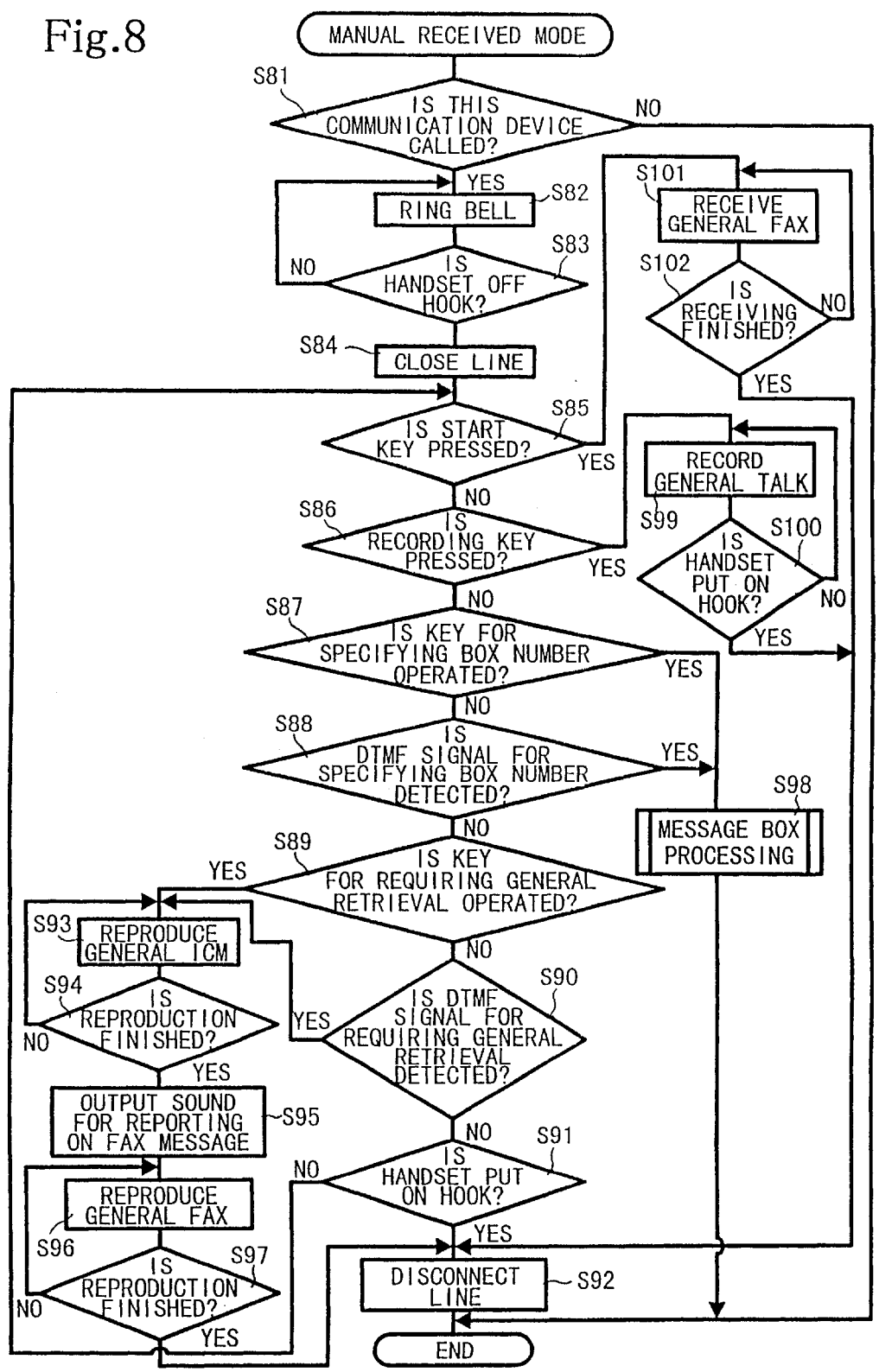
FIG. 8 is a flowchart for explaining the procedure of receiving processing in a manual receiving mode by the facsimile terminal equipment shown in FIG. 1.

Next, receiving processing in a manual receiving mode will be described. In the manual receiving mode, as shown in FIG. 8, the CPU 1 judges whether the facsimile terminal equipment is called (S81).

If the equipment is called (S81: YES), the CPU 1 rings the calling bell (S82) and judges whether the handset is off hook (S83). That is, the CPU 1 checks whether a user lifts the handset off hook or presses the speaker phone key 42.

If the handset is off hook (S83: YES), the CPU 1 controls the NCU 2 to close a line and receive (S84). The CPU 1 then judges whether the start key 33 of the body is pressed (S85). That is, the CPU 1 checks whether the user of the above facsimile terminal equipment presses the start key 33 of the body.

If the start key is not pressed (S85: NO), the CPU 1 judges whether the recording key 24 of the body is pressed (S86). That is, the CPU 1 checks whether the recording key 24 is pressed because the user of the facsimile terminal equipment presses the recording key 24 of the body to record the conversation.

If the recording key 24 is not pressed (S86: NO), the CPU 1 judges whether the key 23 for specifying the message box number is pressed (S87). That is, the CPU 1 checks whether the operation to input a message to any of message boxes A to E is executed because if the user of the calling terminal wants to input a message to any of the message boxes A to E during the conversation, the user operates the facsimile terminal equipment to input the message to the message box. That is, the CPU 1 checks whether the private key 29, any of the box specifying keys 23 and the recording key 24 are pressed in order. However, the keys need not be pressed in the above order and may be pressed in any predetermined order.

If the key 23 for specifying the message box number is not pressed (S87: NO), the CPU 1 judges whether the DTMF signal for specifying the box number is detected (S88). That is, the CPU 1 checks whether the DTMF signal is input because if the user of the calling terminal wants to input a message to the message box, the DTMF signal corresponding to the pressed dial key is input via the telephone line 21 when any dial key of the calling terminal is pressed to specify the message box number without requesting that the user of the facsimile terminal equipment execute the operation. The box specifying keys 23 (A to E) of the facsimile terminal equipment correspond to each message box, respectively, and these message boxes respectively correspond to the dial keys 1 to 5 of the calling terminal, for example. Therefore, the desired message box is specified by pressing any of the dial keys 1 to 5 on the side of the calling terminal in place of pressing any of the box specifying keys 23 (A to E). For example, the dial keys of the calling terminal are pressed in the order of [0], [1] and [*] in place of the box specifying key 23 (A).

If the DTMF signal for specifying the box number is not detected (S88: NO), the CPU 1 judges whether a key for requiring general retrieval is pressed (S89). That is, the CPU 1 checks whether an operation to input a message to the general mail box is executed by the user of the facsimile terminal equipment. If the user of the calling terminal wants to input a message to the message box for a specific individual but not to the general mail box, he/she informs the user of the facsimile terminal equipment of the above during the conversation. That is, the CPU 1 checks whether the private key 29 and the recording key 24 are pressed in order. However, the keys need not be pressed in the above order and may be pressed in any predetermined order.

If the key for requiring general retrieval is not pressed (S89: NO), the CPU 1 judges whether the DTMF signal for requiring general retrieval is detected (S90). That is, the CPU 1 checks whether the DTMF signal is input because if the user of the calling terminal wants to input a message to the general mail box, the DTMF signal corresponding to the pressed dial key 1–5 is input via the telephone line 21 when any dial key 1–5 of the calling terminal is pressed without requesting that the user of the facsimile terminal equipment execute the operation for the above. The dial key 1–5 is required to be determined beforehand to differentiate it from the dial key for specifying the message box number.

If the DTMF signal for requiring general retrieval is not detected (S90: NO), the CPU 1 judges whether the handset is on hook (S91). That is, the CPU 1 checks whether the user puts the handset of the body on hook, presses speaker phone key 42 or presses the outside line key 52 of the accessory handset 16.

If the handset is on hook (S91: YES), the CPU 1 controls the NCU 2 to disconnect the line (S92) and terminates the routine.

In S91, if the handset is not on hook (S91: NO), processing returns to S85 and the conversation continues.

In S90, if the DTMF signal for requiring general retrieval is detected (S91: YES), the CPU 1 starts the reproduction of the contents of general information storage area (S93). That is, the CPU 1 reads voice data stored in the voice data storage area of any general information storage area in the RAM 3. The CODEC 8 then converts the voice data to the analog aural signal. Then the CPU 1 sends the aural signal to the telephone line 21 via the NCU 2. Next, the CPU 1 judges whether the reproduction of the contents of the general information storage area is finished (S94).

If the reproduction of the contents of general information storage area is finished (S94: YES), the CPU 1 outputs a sound for reporting a facsimile message (S95). Specifically, the CPU 1 reads voice data corresponding to the reporting message that facsimile data stored in the response message storage area in the RAM 3 is sent. The CODEC 8 then converts the voice data to the analog aural signal. The CPU 1 then sends the aural signal to the telephone line 21 via the NCU 2. Facsimile receiving is started when the user of the calling terminal presses the start key of the calling terminal.

Next, the CPU 1 reproduces facsimile data in the general mail box (S96). Specifically, the CPU 1 reads facsimile data stored in the facsimile data storage area of any general information storage area corresponding to the general mail box in the RAM 3. The modem 4 then modulates the facsimile data. Then the CPU 1 sends the facsimile signal to the telephone line 21 via the NCU 2. Next, the CPU 1 judges whether the reproduction of facsimile data in the general mail box is finished (S97).

If the reproduction of facsimile data in the general mail box is finished (S97: YES), processing proceeds to S92, the line is disconnected and the routine terminates.

In S97, if the above reproduction is not finished (S97: NO), processing returns to S96 and the reproduction of facsimile data in the general mail box continues.

In S94, if the reproduction of the contents of the general information storage area is not finished (S94: NO), processing returns to S93 and the reproduction of the contents of the general information storage area continues.

In S89, if general retrieval is executed (S89: YES), processing proceeds to S93 and processing after the reproduction of the contents of the general information storage area is executed.

In S88, if the DTMF signal for specifying the box number is detected (S88: YES), the CPU 1 executes message box processing (S98) because the above means the message is addressed to a specific individual. The CPU 1 then terminates the routine. The above message box processing is the same as that shown in FIG. 6.

In S87, if the key for specifying the message box number is pressed (S87: YES), processing proceeds to S98 because the above means the message is addressed to a specific individual. The CPU 1 then executes message box processing.

In S86, if the recording key 24 is pressed (S86: YES), the CPU 1 executes general conversation recording (S99). That is, aural signals input via the telephone line 21 from the calling terminal and aural signals from the microphone of the handset are converted to digital voice data by the CODEC 8 and are stored in the RAM 3. The above voice data is not stored in a personal information storage area or a general information storage area because it is not a message. Instead, the voice data is stored in a separate, predetermined area. Next, the CPU 1 judges whether the handset is put on hook (S100). That is, the CPU 1 checks whether the user puts the handset of the body on hook 1 presses the speaker phone key 42 or presses the outside line key 52 of the accessory handset 16.

If the handset is put on hook (S100: YES), processing proceeds to S92, the line is disconnected and the routine terminates.

In S100, if the handset is not put on hook (S100: NO), processing returns to S99 and the general talk recording continues.

In S85, if the start key is pressed (S85: YES), the CPU 1 executes general facsimile receiving (S101) because the above means that facsimile data not addressed to a specific individual is received. Specifically, if memory receiving is set, facsimile data received via the telephone line 21 is stored in the facsimile data storage area in any general information storage area in the RAM 3. If memory receiving is not set, facsimile data received via the telephone line 21 is recorded on recording paper by the recording section 12. Next, the CPU 1 judges whether the general facsimile receiving is finished (S102).

If general facsimile receiving is finished (S102: YES), processing proceeds to S92, the line is disconnected and the routine terminates.

In S102, if general facsimile receiving is not finished (S102: NO), processing returns to S101 and the general facsimile receiving continues.

In S83, if the handset is not off hook (S83: NO), processing returns to S82 and ringing the calling bell continues.

In S81, if the facsimile terminal equipment is not called (S81: NO), the routine terminates.

Figure 9:
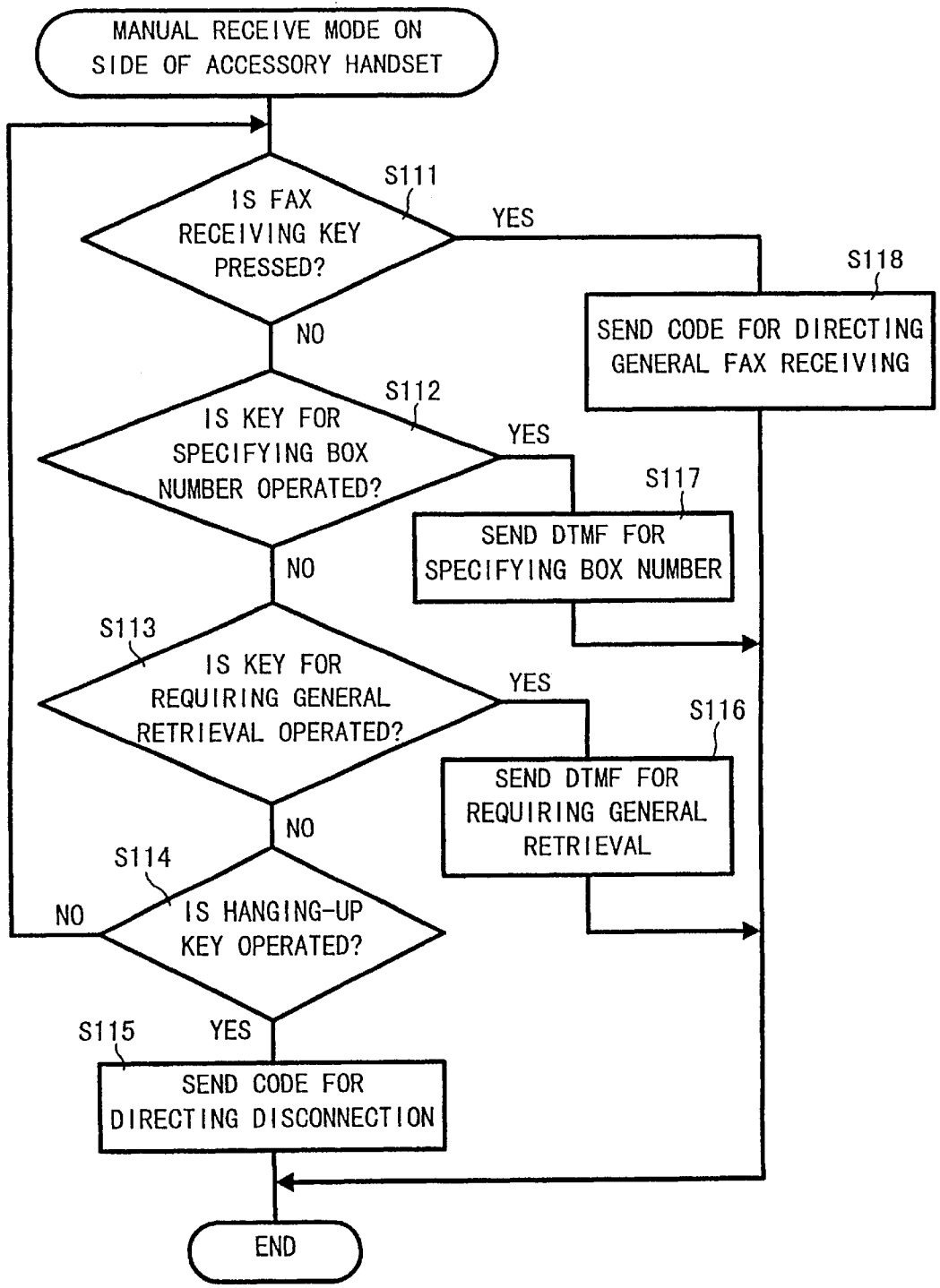
FIG. 9 is a flowchart for explaining the procedure of receiving processing in a manual receiving mode on the side of an accessory handset by the facsimile terminal equipment shown in FIG. 1.

Next, a conversation in a manual receiving mode using the accessory handset 16 is described. As shown in FIG. 9, the CPU 1 of the accessory handset 16 judges whether the facsimile receiving key 60 is pressed (S111). That is, the CPU 1 checks whether the user of the accessory handset 16 presses the facsimile receiving key 60 because if the user of the calling terminal wants facsimile sending not addressed to a specific individual and requests the user of the accessory handset 16 to enable the facsimile sending during the conversation, the user of the accessory handset 16 presses the facsimile receiving key 60.

If the facsimile receiving key 60 is not pressed (S111: NO), the CPU (not shown) of the accessory handset 16 judges whether the key for specifying the message box number is pressed (S112). That is, the CPU of the accessory handset 16 checks whether the key for specifying the message box number is pressed because if the user of the calling terminal wants to input a message addressed to a specific individual to the message box and requests the user of the accessory handset 16 to enable the above input during the conversation, the user of the accessory handset 16 presses a predetermined dial key 51 to specify the message box number. The operation of the above dial key 51 is the same as that in case the message box number is specified by the DTMF signal using the calling terminal.

If the key for specifying the message box number is not pressed (S112: NO), the CPU of the accessory handset 16 judges whether the key for requiring general retrieval is pressed (S113) . That is, the CPU of the accessory handset 16 checks whether the key for requiring general retrieval is pressed because if the user of the calling terminal wants to retrieve a message stored in the general mail box and not addressed to a specific individual and requests the user of the accessory handset 16 to enable the retrieval of the message during the conversation, the user of the accessory handset 16 presses a predetermined dial key 51. The operation of the dial key 51 is the same as when general retrieval is required by the DTMF signal using the calling terminal.

If the key for requiring general retrieval is not pressed (S113: NO), the CPU of the accessory handset 16 judges whether the hanging-up key 53 is pressed (S114). That is, the CPU of the accessory handset 16 checks whether the hanging-up key is pressed because if the conversation is finished, the user of the accessory handset 16 presses the hanging-up key 53.

If the hanging-up key 53 is pressed (S114: YES), the CPU of the accessory handset 16 sends a code for directing disconnection to the communication section 15 of the body (S115) and terminates the routine. Then, the body disconnects the line.

In S114, if the hanging-up key 53 is not pressed (S114: NO), processing returns to S111 and the above procedure repeats.

In S113, if the key for requiring general retrieval is pressed (S113: YES), the CPU of the accessory handset 16 sends the DTMF signal for requiring general retrieval to the communication section 15 of the body (S116). The CPU of the accessory handset 16 then terminates the routine. Then, the body executes the same operation as in the case where the DTMF signal for requiring general retrieval is input via the telephone line 21.

In S112, if the key for specifying the message box number is pressed (S112: YES), the CPU of the accessory handset 16 sends the DTMF signal for specifying the message box number to the communication section 15 of the body (S117). The CPU of the accessory handset 16 then terminates the routine. Then, the body executes the same operation as in the case where the DTMF signal for specifying the message box number is input via the telephone line 21.

In S111, if the facsimile receiving key 60 is pressed (S111: YES), the CPU 1 of the accessory handset 16 sends a code for directing general facsimile receiving to the communication section 15 of the body (S118). The CPU 1 then terminates the routine. Then, the CPU 1 executes processing for general facsimile receiving.

Figure 10:
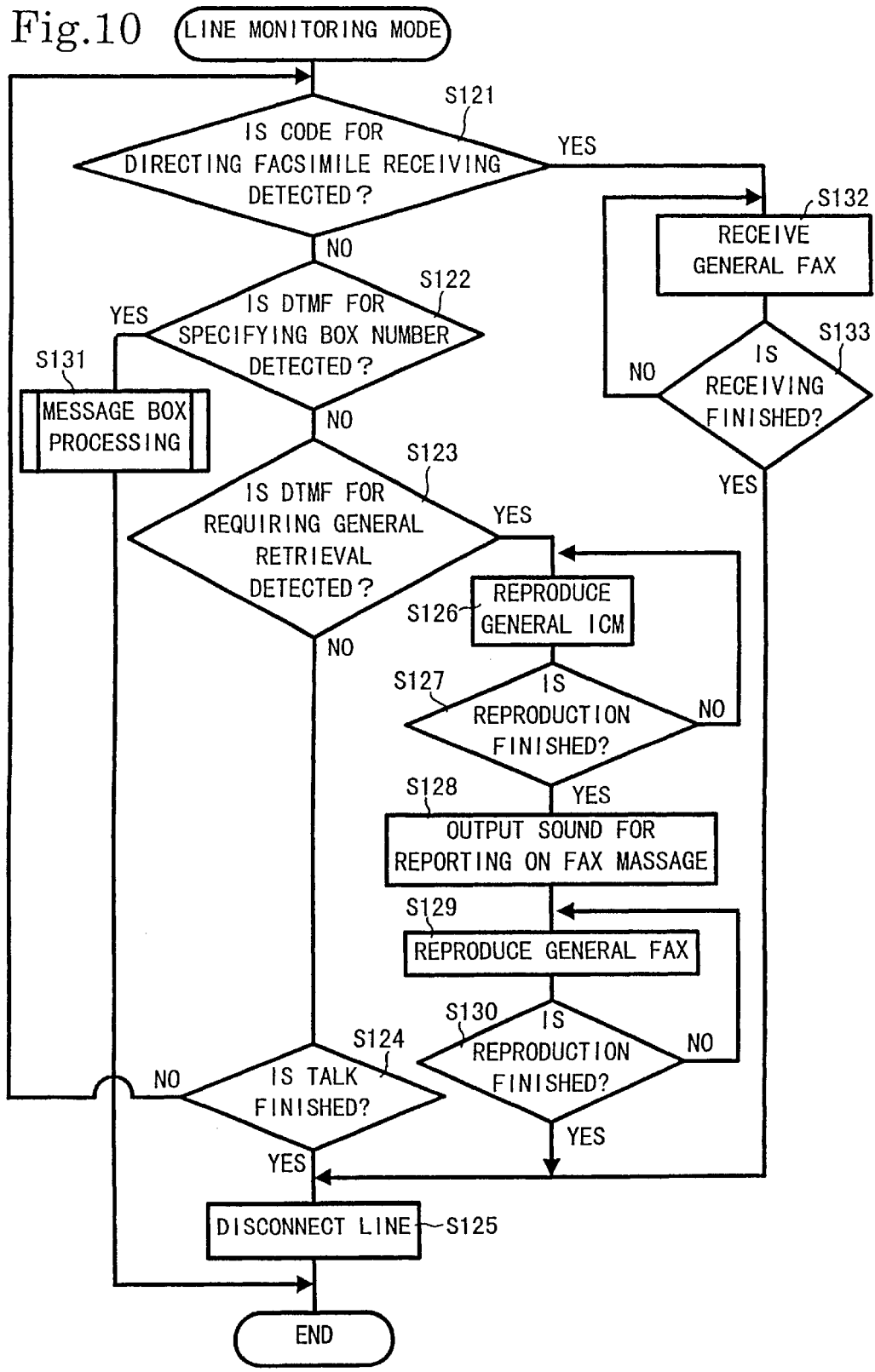
FIG. 10 is a flowchart for explaining the procedure of receiving processing in a line monitoring mode by the facsimile terminal equipment shown in FIG. 1.

Next, a line monitoring mode which is the operation mode of the body when the accessory handset 16 is in the manual receiving mode will be described. In the line monitoring mode, as shown in FIG. 10, first, the CPU 1 judges whether a code for directing facsimile receiving is detected (S121). That is, the CPU 1 checks whether the code for directing facsimile receiving from the accessory handset 16 is received by the communication section 15.

If the code for directing facsimile receiving is not detected (S121: NO), the CPU 1 judges whether the DTMF signal for specifying the message box number is detected (S122). That is, the CPU 1 checks whether the DTMF signal for specifying the message box number from the accessory handset 16 is received by the communication section 15 or the DTMF signal for specifying the message box number is input via the telephone line 21.

If the DTMF signal specifying the message box number is not detected (S122: NO), the CPU 1 judges whether the DTMF signal requiring general retrieval is detected (S123). That is, the CPU 1 checks whether the DTMF signal requiring general retrieval from the accessory handset 16 is received by the communication section 15 or the DTMF signal for requiring general retrieval is input via the telephone line 21.

If the DTMF signal requiring general retrieval is not detected (S123: NO), the CPU 1 judges whether the conversation is finished (S124). That is, the CPU 1 checks whether a code for directing disconnection from the accessory handset 16 is received by the communication section 15.

If the conversation is finished (S124: YES), the CPU 1 controls the NCU 2 to disconnect the line (S125) and terminates the routine.

In S124, if the conversation is not finished (S124: NO), processing returns to S121 and the above processing repeats.

In S123, if the DTMF signal requiring general retrieval is detected (S123: YES), the CPU 1 starts the reproduction of the contents of the general information storage area (S126). Specifically, the CPU 1 reads voice data stored in the voice data storage area in any general information storage area in the RAM 3. Then, the CODEC 8 convert the voice data to the.analog aural signal. Then the CPU 1 sends the aural signal to the telephone line 21 via the NCU 2. Next, the CPU 1 judges whether the reproduction of the contents of the general information storage area is finished (S127).

If the reproduction of the contents of the general information storage area is finished (S127: YES), the CPU 1 outputs a sound for reporting on the facsimile message (S128). Specifically, the CPU 1 reads voice data corresponding to a reporting message that facsimile data stored in the response message storage area in the RAM 3 is sent. Then, the CODEC 8 converts the voice data to the analog aural signal. Then the CPU 1 sends the aural signal to the telephone line 21 via the NCU 2. Then, when the user of the calling terminal presses the start key of the calling terminal, facsimile receiving starts.

Next, the CPU 1 reproduces facsimile data in the general mail box (S129). Specifically, the modem 4 modulates facsimile data stored in the facsimile data storage area of the general information storage area corresponding to the general mail box in the RAM 3. Then, the CPU 1 sends the facsimile signal to the telephone line 21 via the NCU 2. Next, the CPU 1 judges whether the reproduction of facsimile data in the general mail box is finished (S130).

If the reproduction of the facsimile data in the general mail box is finished (S130: YES), processing proceeds to S125, the line is disconnected and the routine terminates.

In S130, if the reproduction of the facsimile data in the general mail box is not finished (S130: NO), processing returns to S129 and the reproduction of the facsimile data in the general mail box continues.

In S127, if the reproduction of the contents of the general information storage area is not finished (S127: NO), processing returns to S126 and the reproduction of the contents of the general information storage area continues.

In S122, if the DTMF signal for specifying the message box number is detected (S122: YES), the CPU 1 executes message box processing (S131) and terminates the routine. The above message box processing is he same as that shown in FIG. 6.

In S121, if the code for directing facsimile receiving is detected (S121: YES), the CPU 1 executes general facsimile receiving (S132). Specifically, if memory receiving is set, facsimile data received via the telephone line 21 is stored in the facsimile data storage area of any general information storage area in the RAM 3. If memory receiving is not set, facsimile data received via the telephone line 21 is recorded on recording paper by the recording section 12. Next, the CPU 1 judges whether general facsimile receiving is finished (S133).

If general facsimile receiving is finished (S133: YES), processing proceeds to S125, the line is disconnected and the routine terminates.

In S133, if general facsimile receiving is not finished (S133: NO), processing returns to S132 and general facsimile receiving continues.

Figure 11:
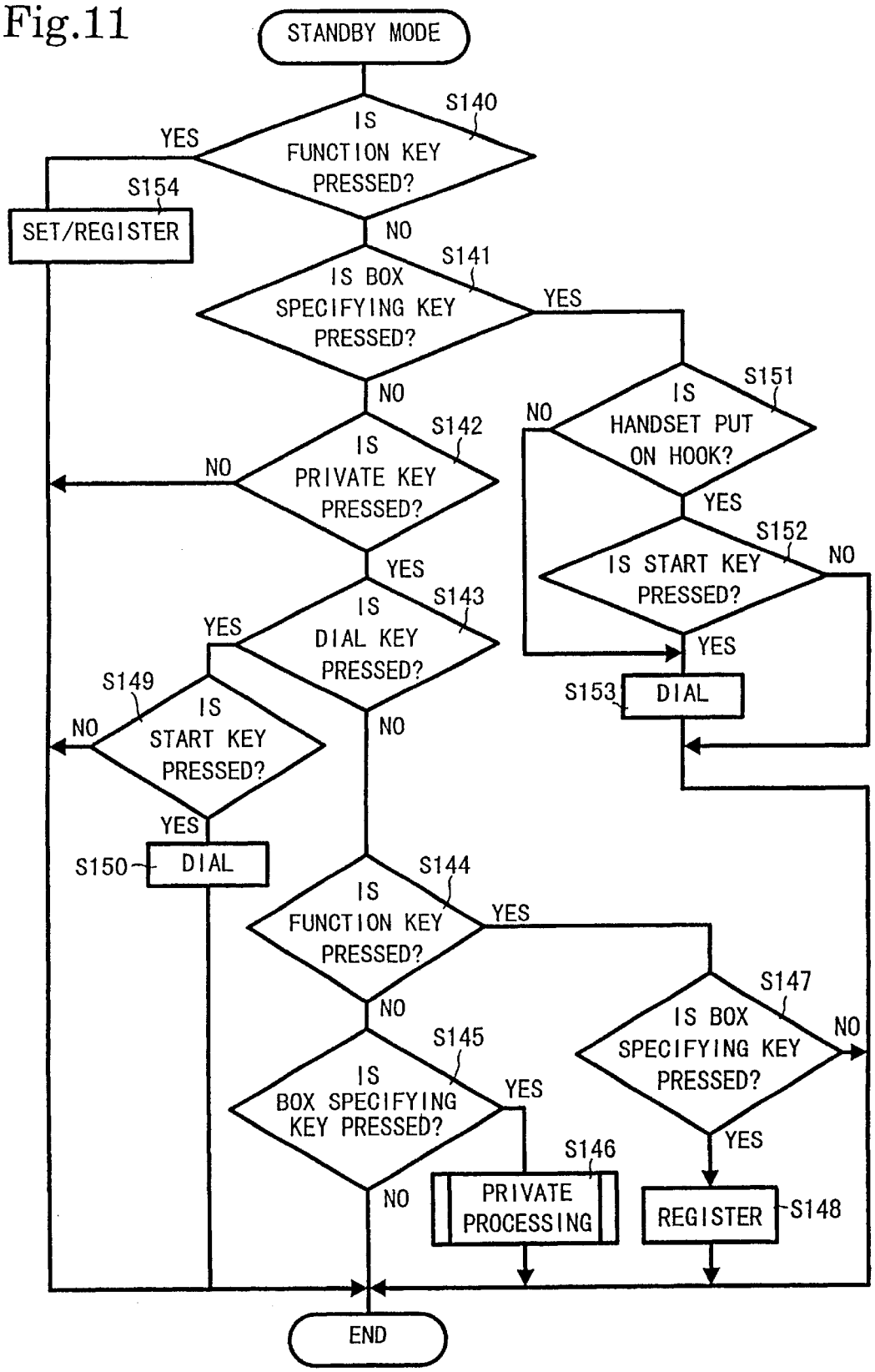
FIG. 11 is a flowchart for explaining the procedure of various processing in a standby mode by the facsimile terminal equipment shown in FIG. 1.

Next, a standby mode, which is an operation mode of the body when no sending, receiving and copying are executed, and the operation based on a key operation from the standby mode, will be described. In the standby mode, as shown in FIG. 11, the CPU 1 judges whether the function key 28 is pressed (S140). That is, because various setting and registration events, except matters related to the message box, are made in the RAM 3 and the EEPROM 6 of the above facsimile terminal equipment, when a user presses the function key 28, the CPU 1 checks that the function key 28 is pressed.

If the function key 28 is not pressed (S140: NO), the CPU 1 judges whether any of the box specifying keys 23 are pressed (S141). That is, the box specifying keys 23 are used not only for specifying the message box number but also for a touch tone dial. If the user wants to call using the touch tone dial, the user presses a desired box specifying key 23 and the CPU 1 checks that one of the box specifying keys 23 is pressed.

If no box specifying key 23 is pressed (S141: NO), the CPU 1 judges whether the private key 29 is pressed (S142). That is, the user presses the private key 29 for registration related to the message box, the display of a telephone directory, access and other functions.

If the private key 29 is not pressed (S142: NO), the CPU 1 terminates the routine. In the standby mode, the CPU 1 waits ready for detecting that the function key 28, any of the box specifying keys 23 or the private key 29 is pressed.

In S142, if the private key 29 is pressed (S142: YES), the CPU 1 judges whether any of the dial keys 22 are pressed (S143). That is, if the user wants to retrieve the whole classified telephone directory of every specific individual corresponding to the message box, the user presses any of the dial keys 22 after the private key 29. The CPU 1 checks this event. The telephone directory in this embodiment is a set of telephone numbers stored in the EEPROM 6 by the operation for registration of the user. The name of a destination and a serial number representing a position in the telephone directory are stored in the EEPROM 6 with the name of the destination related to each telephone number. A group name can also be registered in the telephone directory with the group name corresponding to each telephone number. Then, a private telephone directory including only telephone numbers classified under the same group name can be utilized. Then, if a private telephone directory is used, the private telephone directory can be used as a telephone directory in which only telephone numbers that belong to a specific group are registered.

In S143, if none of the dial keys 22 are pressed (S143: NO), the CPU 1 judges whether the function key 28 is pressed (S144). That is, the CPU 1 checks in a user executes various setting and registration events related the message box by pressing the function key 28 after the private key 29.

In S144, if the function key 28 is not pressed (S144: NO), the CPU 1 judges whether any of the box specifying keys 23 are pressed (S145) That is, the CPU 1 checks if the user wants to utilize a private telephone directory and wants access to the message box by pressing a desired box specifying key 23 after the private key 29.

In S145, if no box specifying key 23 is pressed (S145: NO), the CPU 1 terminates the routine. That is, if none of the box specifying keys 23 are pressed and the function key 28 is not pressed in a predetermined time after the private key 29 is pressed, processing to be executed cannot be specified, and the CPU 1 terminates the routine.

In S145, if any of the box specifying keys 23 are pressed (S145: YES), the CPU 1 executes dialing utilizing a private telephone directory and private processing for accessing a message box (S146). The CPU 1 then terminates the routine. The above private processing will be described in detail later.

In S144, if the function key 28 is pressed (S144: YES), the CPU 1 judges whether any of the box specifying keys 23 are pressed (S147). That is, the CPU 1 checks if registration related to a message box specified by the box specify key 23 is made by the user pressing the private key 29, the function key 28 and any of the box specifying keys 23 in order.

If any of the box specifying keys 23 is pressed (S147: YES), the CPU 1 executes various registration events based upon an operation for registration by the user (S148) and terminates the routine. That is, the name of a group and a response message for example, are stored in the RAM 3 or in the EEPROM 6 according to various key operations by the user.

In S147, if no box specifying key 23 is pressed (S147: NO), the CPU 1 terminates the routine. That is, if no box specifying key 23 is pressed in the predetermined time after the function key 28 is pressed, the CPU 1 judges that the user does not want registration related the message box. The CPU 1 and terminates the routine.

In S143, if any of the dial keys 22 are pressed (S143: YES), the CPU 1 judges whether the start key 33 is pressed (S149). That is, the CPU checks whether the start key 33 to dial a telephone number specified by the dial key 22,is pressed after the private key 29 and any of the dial keys are pressed.

If the start key 33 is pressed (S149: YES), the telephone number is dialed (S150) and the routine terminates. That is, when the user inputs a desired two digits of serial number in a telephone directory by pressing the dial keys 22, the name or the telephone number of a destination corresponding to the serial number is displayed on the display screen of LCD 45. The user then presses the start key 33 if the destination is the desired one. Then, the telephone number of the destination displayed on the display screen of LCD 45 is automatically called.

In S149, if the start key 33 is not pressed (S149: NO), the CPU 1 terminates the routine. That is, if the start key 33 is not pressed in the predetermined time after any of the dial keys 22 are pressed, the CPU 1 judges that the user does not want a call utilizing an abbreviated dial in a private telephone directory. The CPU 1 then terminates the routine.

In S141, if any of the box specifying keys 23 are pressed (S143: YES), the CPU 1 judges whether the handset is put on hook (S151) because the above means that the user wants to dial the telephone number of the touch tone dial corresponding to the box specifying key 23.

If the handset is put on hook (S151: YES), the CPU 1 judges whether the start key 33 is pressed (S152). That is, if the user presses any of the box specifying keys 23, the name of the destination of the touch tone dial corresponding to the box specifying key 23 is displayed on the LCD 45 display screen. If the desired destination is correct, the user presses the start key 33 with the handset on hook.

If the start key 33 is pressed (S152: YES), the CPU 1 dials the telephone number specified by the box specified key 23 (S153) and terminates the routine.

In S152, if the start key 33 is not pressed (S152: NO), the CPU 1 terminates the routine without dialing. That is, if the start key 33 is not pressed in the predetermined time after any of the box specifying keys 23 are pressed, the CPU 1 judges that the user does not want the call by the touch tone dial. The CPU 1 then terminates the routine.

In S151, if the handset is not put on hook (Sl51: NO), the line is already closed, and processing proceeds to S153 without waiting for the start key 33 to be pressed. The telephone number is then dialed.

In S140, if the function key 28 is pressed (S140: YES), the CPU 1 judges that the user wants various setting and registration events, except matters related to the message box, the CPU 1 then executes setting and registration according to various key operations by the user (S154). The CPU 1 then terminates the routine.

Figure 12:
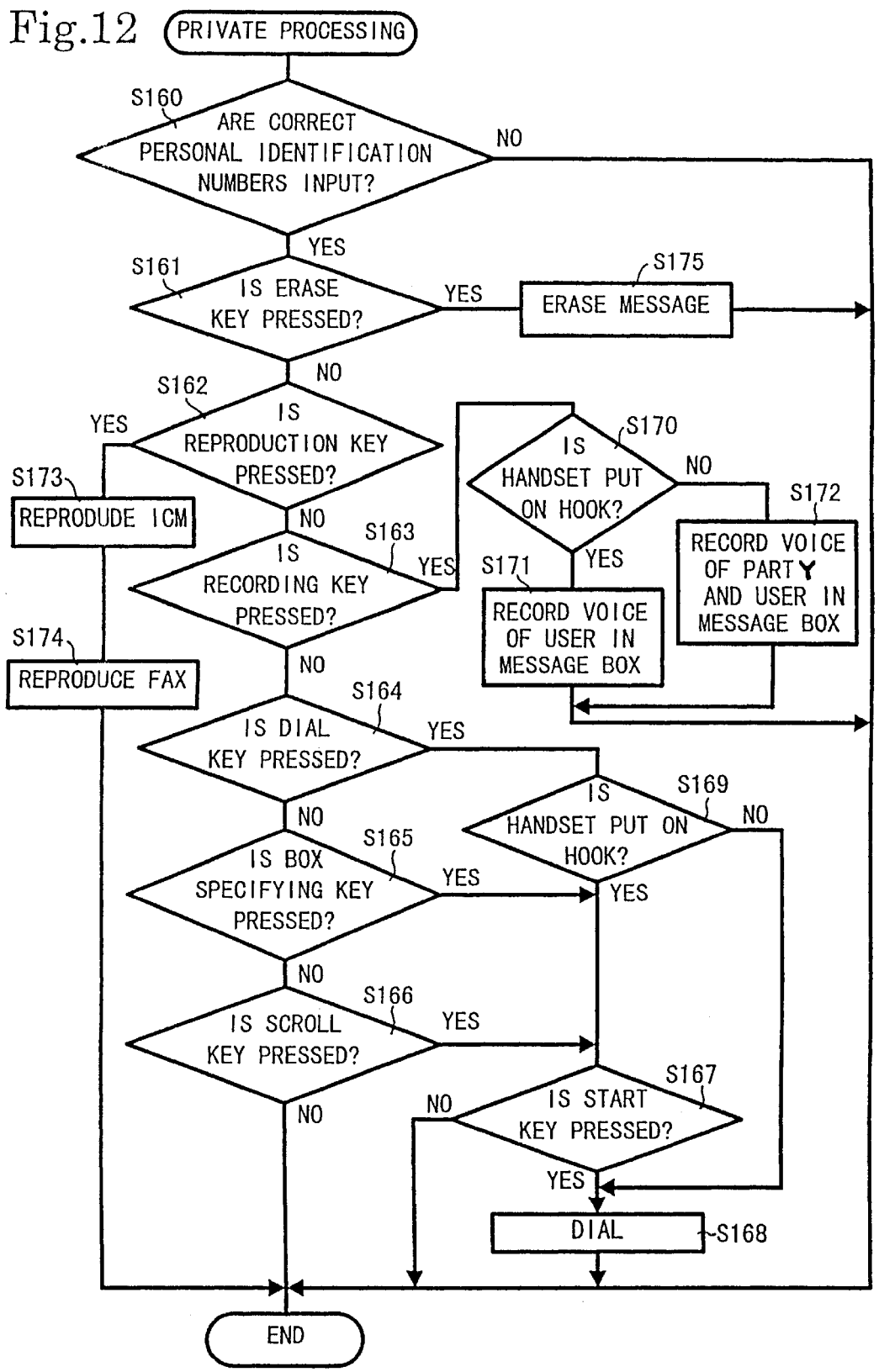
FIG. 12 is a flowchart for explaining the details of the procedure of private processing in the flowchart shown in FIG. 11.

Next, the details of private processing executed in S146 will be described. In the private processing, as shown in FIG. 12, the CPU 1 judges whether correct personal identification numbers are input (S160). Specifically, the CPU 1 checks whether personal identification numbers corresponding to the message box specified by any of the box specifying keys 23 are input by the user pressing some of the dial keys 22. That is, the CPU 1 checks personal identification numbers to prevent a person who does not know the personal identification numbers of the message box from using the private telephone directory or from accessing the message box.

If correct personal identification numbers are input (S160: YES), the CPU 1 judges whether the erase key 25 is pressed (S161). That is, the CPU 1 checks if the user wants to erase a message stored in the message box. The user indicates an erase operation by pressing the erase key 25.

If the erase key 25 is not pressed (S161: NO), the CPU 1 judges whether the reproduction key 26 is pressed (S162). That is, the CPU 1 checks if the user wants to reproduce a message stored in the message box by pressing the reproduction key 26.

If the reproduction key 26 is not pressed (S162: NO), the CPU 1 judges whether the recording key 24 is pressed (S163). That is, the CPU 1 checks if the user wants to store a message in the message box by pressing the recording key 24.

If the recording key 24 is not pressed (S163: NO), the CPU 1 judges whether some of the dial keys 22 are pressed (S164). That is, the CPU 1 checks if the user wants to call, by an abbreviated dial utilizing a private telephone directory, by pressing one or more of the dial keys 22.

If no dial key 22 is pressed (S164: NO), the CPU 1 judges whether any of the box specifying keys 23 is pressed (S165). That is, the CPU 1 checks if the user wants to retrieve a private telephone directory and make a call, by pressing any of the box specifying keys 23 or the left or the right scroll key 36 or 38.

If no box specifying keys 23 are pressed (S165: NO), the CPU 1 judges whether the left or the right scroll key 36 or 38 are pressed (S166). That is, the CPU 1 checks if the user wants to retrieve a private telephone directory and make a call, by determining if the under presses any of the box specifying keys 23 or the left or the right scroll keys 36 or 38.

If the left or the right scroll keys 36 or 38 are not pressed (S166: NO), the CPU 1 terminates the routine. That is, if no key operation is executed in predetermined time after correct personal identification numbers are input, the CPU 1 judges that the user does not want the use of the private telephone directory and access to the message box. The CPU 1 then terminates the routine.

In S166, if the left scroll key 36 or the right scroll key 38 is pressed (S166: YES), the CPU 1 judges whether the start key 33 is pressed (S167). That is, as the name of a sending destination displayed on the LCD 45 display screen in a private telephone directory is switched in order when the user presses the left scroll key 36 or the right scroll key 38. The CPU 1 then checks if the user presses the start key 33 to indicate when the name of the desired sending destination is displayed.

If the start key 33 is pressed (S167: YES), the CPU 1 dials the telephone number corresponding to the sending destination displayed on the LCD 45 display screen (S168). The CPU 1 then terminates the routine.

In S167, if the start key 33 is not pressed (S167: NO), the CPU 1 terminates the routine without dialing. That is, if the start key 33 is not pressed in the predetermined time after the left scroll key 36 or the right scroll key 38 is pressed, the CPU 1 judges that the user does not want the call by the retrieval of the private telephone directory. The CPU 1 then terminates the routine.

In S165, if any of the box specifying keys 23 are pressed (S165: YES), processing proceeds to S167 and processing after the CPU 1 judges whether the start key 33 is pressed is executed. That is, when the name of a sending destination displayed on the LCD 45 display screen in a private telephone directory is switched in order every time the user presses a desired box specifying key 23, the CPU 1 executes the same processing as in case the left or right scroll keys 36 or 38 are pressed.

In S164, if one or more of the dial keys 22 are pressed (S164: YES), the CPU 1 judges whether the handset is put on hook (S169).

If the handset is put on hook (S169: YES), processing proceeds to S167. If the handset is not put on hook (S169: NO), the start key 33 is not required to be pressed, and processing proceeds to S168.

In S163, if the recording key 24 is pressed (S163: YES), the CPU 1 judges whether the handset is put on hook (S170).

If the handset is put on hook (S170: YES), the CPU 1 records the data of the voice of the user in the message box (S171). If the handset is not put on hook (S170: NO), the CPU 1 records the data of the voice of a party and the user in the message box (S172) and terminates the routine. In the above recording of the user voice data the voice of the user is input to the microphone, provided differently from the handset, and is stored in the message box. In the above recording of the voice data of a party and a user, the voice of the party is input via the telephone line 21 and the voice of the user is stored in the message box.

If the handset is put on hook (S170: YES), the CPU 1 records the data of the voice of the user in the message box (S171), and if the handset is not put on hook (S170: NO), the CPU 1 records the data of the voice of a party and the user in the message box (S172) and terminates the routine. The recording of the user's voice means storing the data of the voice of the user input to the microphone provided differently from the handset in the message box. The recording of the party's voice and the user's voice means storing the data of the voice of a party input via the telephone line 21 and the voice of the user in the message box.

In S162, if the reproduction key 26 is pressed (S162: YES), the CPU 1 reproduces the voice message stored in the message box (S173). The CPU 1 then reproduces the facsimile message stored in the message box (S174) and terminates the routine. When the voice message is reproduced, the handset speaker is used if the handset is off hook. A speaker provided separately from the handset is used if the handset is put on hook. A facsimile message is reproduced by printing an image based on facsimile data stored in the message box on recording paper by the recording section 12.

In S161, if the erase key 25 is pressed (S161: YES), the CPU 1 erases the message stored in the message box (S175). The CPU 1 then terminates the routine.

In S160, if correct personal identification numbers are not input (S160: NO), the CPU 1 terminates the routine.

"A message box" described in the procedure of the above private processing shown in FIG. 12 means the message box specified when the user presses any of the box specifying keys 23.

In the illustrated embodiment, a suitably programmed general purpose computer controls data processing. However, the processing functions could also be implemented using a simple purpose integrated circuit (e.g., an ASIC) having a main or central processor section for overall, system-level control, and separate circuits dedicated to performing various specific computation, functional and other processes under control of the central processor section. The processing can also be implemented using a plurality of separate dedicated or programmable integrated electronic circuits or devices (e.g., hardwired electronic or logic devices). In general, any device or assembly of devices on which a finite state machine capable of implementing the flow charts of FIGS. 5–12 can be used to control data processing.

In the above embodiment, information stored in a general mail box is output after information stored in a message box is output at a user's request of a calling terminal, however, information stored in a general mail box may be also automatically output without a user's request of a calling terminal after information stored in a message box is output.

Also, in the above embodiment, information stored in a general mail box is output after information stored in a message box is output, however, information stored in a message box may be also output after information stored in a general mail box is output. In this case, if information consists of both voice information and image information, first voice information in a general mail box is output, next voice information in a message box is output, next image information in a general mail box is output and finally, image information in a message box is output.

The invention has been described with reference to the preferred embodiments thereof, which are illustrative and not limiting. Various changes may be made without departing from the spirit and scope of the invention as defined in the following claims.

What is claimed is:

1. A communication device capable of communicating with at least one of other communication devices, comprising:
    personal information storing means for storing personal information which can be inputted/outputted for a specific individual, said personal information storing means having a password and identification information of a predetermined communication device which are previously registered for the specific individual;
    personal information input/output control means for inputting said personal information transmitted from at least one of other communication devices, into said personal information storing means and for outputting said personal information stored in said personal information storing means to at least one of other communication devices; and
    notifying means for notifying the predetermined communication device specified by said identification information that said personal information input/output control means has inputted said personal information into said personal information storing means,
    wherein said personal information input/output control means outputs said personal information from said personal information storing means to at least one of other communication devices only when said password is inputted from said at least one of other communication devices.

2. The communication device according to claim 1, wherein said personal information input/output means inputs said personal information into said personal information storing means when said password is not inputted via said communication line.

3. The communication device according to claim 1, wherein the predetermined communication device is a mobile communication device.

4. The communication device according to claim 3, wherein the predetermined communication device is a pager and notifying means calls the pager number.

5. A facsimile device, with a telephone function, capable of communicating with at least one external communication device via a communication line, the facsimile device having an automatic message recording mode and at least one of a facsimile/telephone mode, a manual receiving mode and a line monitoring mode, the facsimile device comprising:
    a personal information memory for storing personal information which can be inputted/outputted for a specific individual;
    an access control means for controlling access to said personal information memory from said at least one external communication device via said communication line,
    wherein said access control means allows the at least one external communication device to access to said personal information memory when a predetermined signal is transmitted from the at least one external communication device regardless of each mode condition of the facsimile device and wherein said control means allows the at least one external communication device to access to said personal information memory in accordance with an input of a predetermined signal by a user from the facsimile device even when the user closes the communication line.

6. The facsimile device according to claim 5, wherein the personal information memory has a password for the specific individual, and wherein the predetermined signal is different from the password.

7. The facsimile device according to claim 5, wherein the access control means allows the at least one external communication device to access said personal information memory in accordance with the input of the predetermined signal from the facsimile device by a user even when the user closes the communication line, the facsimile device being in the manual receiving mode.

8. The facsimile device according to claim 5, further comprising an accessory handset, wherein the access control means allows the at least one external communication device to access said personal information memory in accordance with the input of the predetermined signal from the accessory handset by a user even when the user closes the communication line, the facsimile device being in the line monitoring mode.

9. The facsimile device according to claim 5, wherein the facsimile device further has a standby mode and wherein the access control means allows a user to access said personal information memory in accordance with the input of the predetermined signal from the facsimile device by a user, with the facsimile device being in the standby mode.

10. The facsimile device of claim 3 wherein;
the at least one external communication device can access the personal information memory to store the personal information from the at least one external communication device to the personal information memory or to retrieve the personal information, transmitted via communication line, from the personal information memory.

11. The facsimile device of claim 5 wherein; the facsimile device inputs the personal information, transmitted via said communication line, to the personal information memory when a password different from the predetermined signal is not transmitted via said communication line, and the facsimile device outputs the personal information stored in the personal information memory to the at least one external communication device when the password is transmitted from the at least one external communication device.

12. The facsimile device of claim 5 further comprising a general information memory, wherein the at least one external communication device can access the personal information memory when the at least one external communication device inputs a first predetermined signal, and can access the general information memory when the at least one external communication device inputs a second predetermined signal different from the first predetermined signal.

13. A communication device capable of communicating with at least one external communication device via communication line, comprising:

personal information storing means for storing personal information which can be inputted/outputted for a specific individual via said communication line;

password reception detecting means for detecting whether a password, previously registered in the communication device, for the specific individual is inputted from said at least one external communication device via said communication line;

personal information input/output control means for inputting said personal information, transmitted via said communication line, into said personal information storing means, and for outputting said personal information stored in said personal information storing means to said at least one external communication device via said communication wherein said personal information input/output control means inputs said personal information into said personal information storing means when said password reception detecting means does not detect the password inputted via said communication line, and said personal information input/output control means outputs said personal information when said password reception detecting means detects the password from said at least one external communication device.

14. A communication device capable of communicating with at least one external communication device via a communication line, comprising:

personal information storing means for storing personal information for a specific individual;

first input means for inputting personal information into the personal information storing means only under a first condition, the first condition comprising an input of a password from the communication device by a user, wherein the personal information is inputted from the communication device or from the communication device and at least one external communication device via the communication line;

second input means for inputting personal information into the personal information storing means only under a second condition different from said first condition, the second condition needs no password from the communication device.

15. A communication device capable of communicating with an external communication device via a communication line, comprising:

personal information storing means for storing personal information for a specific individual;

first input means for inputting personal information into the personal information storing means only under a first condition;

second input means for inputting personal information into the personal information storing means only under a second condition different from said first condition;

personal information output means for outputting the personal information stored in the personal information storing means to at least one external communication device via the communication line, wherein the personal information output means needs a password for outputting the personal information to at least one external communication device via the communication line.

* * * * *